US010887941B2

(12) United States Patent
Yoo et al.

(10) Patent No.: US 10,887,941 B2
(45) Date of Patent: Jan. 5, 2021

(54) RETAINING ACCESS TO A SHARED RADIO FREQUENCY SPECTRUM BAND DURING AN UPLINK CONTROL PORTION OF A TRANSMISSION STRUCTURE

(71) Applicant: QUALCOMM Incorporated, San Diego, CA (US)

(72) Inventors: Taesang Yoo, Riverside, CA (US); Zhifei Fan, San Diego, CA (US); Jing Sun, San Diego, CA (US); Juan Montojo, San Diego, CA (US); Siddhartha Mallik, San Diego, CA (US); Aleksandar Damnjanovic, Del Mar, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 15/240,040

(22) Filed: Aug. 18, 2016

(65) Prior Publication Data

US 2018/0054848 A1    Feb. 22, 2018

(51) Int. Cl.
*H04W 76/25* (2018.01)
*H04L 5/00* (2006.01)
(Continued)

(52) U.S. Cl.
CPC .......... *H04W 76/25* (2018.02); *H04L 5/0048* (2013.01); *H04L 5/0053* (2013.01);
(Continued)

(58) Field of Classification Search
CPC ... H04L 5/0048; H04L 5/0053; H04L 5/0073; H04W 16/14; H04W 28/26;
(Continued)

(56) References Cited

U.S. PATENT DOCUMENTS 9,942,891 B2 * 4/2018 Yang ..................... H04L 1/0026
2008/0316959 A1 * 12/2008 Bachl .................... H04L 1/1671
370/329
(Continued)

FOREIGN PATENT DOCUMENTS

WO    WO-2016057298 A1    4/2016

OTHER PUBLICATIONS

ISA/EP, International Search Report and Written Opinion of the International Searching Authority, Int'l Application No. PCT/US2017/043197, dated Oct. 4, 2017, European Patent Office, Rijswijk, NL, 15 pgs.
(Continued)

*Primary Examiner* — Khaled M Kassim
(74) *Attorney, Agent, or Firm* — Liem T. Do

(57) ABSTRACT

Techniques are described for wireless communication. One method includes receiving, in a downlink portion of a transmission structure on a shared radio frequency spectrum band, an uplink grant for an uplink data portion of the transmission structure. The transmission structure includes the downlink portion, followed by and time domain multiplexed with an uplink control portion, followed by and time domain multiplexed with the uplink data portion. The method also includes retaining access to the shared radio frequency spectrum band by transmitting an unscheduled transmission during the uplink control portion of the transmission structure.

19 Claims, 16 Drawing Sheets

(51) Int. Cl.
*H04W 72/14* (2009.01)
*H04W 16/14* (2009.01)
*H04W 28/26* (2009.01)
*H04W 72/04* (2009.01)
*H04W 74/02* (2009.01)

(52) U.S. Cl.
CPC ........... *H04L 5/0073* (2013.01); *H04W 16/14* (2013.01); *H04W 28/26* (2013.01); *H04W 72/0413* (2013.01); *H04W 72/0446* (2013.01); *H04W 72/0453* (2013.01); *H04W 72/14* (2013.01); *H04W 74/02* (2013.01)

(58) Field of Classification Search
CPC ......... H04W 72/0413; H04W 72/0446; H04W 72/0453; H04W 72/14; H04W 74/02; H04W 76/25
See application file for complete search history.

(56) References Cited

U.S. PATENT DOCUMENTS

| | | | |
|---|---|---|---|
| 2010/0098006 A1* | 4/2010 | Golitschek Edler Von Elbwart | H04L 1/1861 370/329 |
| 2010/0099429 A1* | 4/2010 | Ishii | H04W 72/1268 455/452.1 |
| 2011/0243012 A1* | 10/2011 | Luo | H04L 5/0055 370/252 |
| 2012/0120924 A1* | 5/2012 | Montojo | H04W 48/12 370/336 |
| 2012/0127948 A1* | 5/2012 | Chung | H04L 5/0053 370/329 |
| 2012/0243497 A1* | 9/2012 | Chung | H04L 5/0055 370/329 |
| 2012/0307775 A1* | 12/2012 | Chung | H04L 1/1671 370/329 |
| 2013/0258914 A1* | 10/2013 | Seo | H04L 1/1896 370/280 |
| 2014/0071952 A1* | 3/2014 | Kim | H04L 5/001 370/335 |
| 2016/0174215 A1* | 6/2016 | Zhang | H04W 72/0413 370/329 |
| 2016/0233989 A1* | 8/2016 | Belghoul | H04L 27/0006 |
| 2016/0344526 A1* | 11/2016 | Fan | H04L 5/0048 |
| 2017/0164213 A1* | 6/2017 | Lim | H04W 24/02 |
| 2017/0238272 A1* | 8/2017 | You | H04W 56/0015 370/350 |
| 2017/0251464 A1* | 8/2017 | Mukherjee | H04W 72/0413 |
| 2018/0041974 A1* | 2/2018 | Suzuki | H04W 52/325 |
| 2018/0054848 A1* | 2/2018 | Yoo | H04W 76/25 |
| 2018/0063820 A1* | 3/2018 | Xiong | H04W 72/042 |

OTHER PUBLICATIONS

Alcatel-Lucent et al., "Comparison Between DRX and Gap-Like Mechanism for IDC TDM Solution," 3GPP TSG-RAN WG2 Meeting #77bis, R2-121694, Jeju, Korea, Mar. 26-30, 2012, 4 pgs., XP050606108, 3rd Generation Partnership Project.

* cited by examiner

RETAINING ACCESS TO A SHARED RADIO FREQUENCY SPECTRUM BAND DURING AN UPLINK CONTROL PORTION OF A TRANSMISSION STRUCTURE

BACKGROUND

The present disclosure, for example, relates to wireless communication systems, and more particularly to retaining access to a shared radio frequency spectrum band during an uplink control portion of a transmission structure.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communication system may include a number of network access devices (e.g., base stations), each simultaneously supporting communication for multiple communication devices, which may be otherwise known as user equipment (UE).

When communicating with a UE over a shared radio frequency spectrum band (e.g., a radio frequency spectrum band that may be used by more than one operator), a base station may contend for access to the shared radio frequency spectrum band prior to transmitting to the UE in a downlink portion of a transmission structure on the shared radio frequency spectrum band. An uplink portion of the transmission structure may follow and be time domain multiplexed with the downlink portion. In some cases, the UE may transmit in the uplink portion, after the base station transmits in the downlink portion, without contending for access to the shared radio frequency spectrum band. Control and data transmissions of the UE may be frequency domain multiplexed within the uplink portion of the transmission structure.

SUMMARY

The described techniques relate to retaining access to a shared radio frequency spectrum band during an uplink control portion of a transmission structure including a downlink portion, followed by and time domain multiplexed with an uplink control portion, followed by and time domain multiplexed with an uplink data portion. Prior to transmitting to the user equipment (UE) in the downlink portion of the transmission structure, a base station may contend for access to the shared radio frequency spectrum band. After successfully contending for access to the shared radio frequency spectrum band, the base station may transmit to the UE in the downlink portion of the transmission structure. After the base station transmits in the downlink portion, the UE may transmit in the uplink control portion or the uplink data portion, in accordance with one or more uplink grants received from the base station in the downlink portion. In some cases, the UE may receive an uplink grant to transmit in the uplink data portion, but not receive an uplink grant to transmit in the uplink control portion. In these cases, the UE may not be scheduled to transmit on the shared radio frequency spectrum band for a time gap between the downlink portion and the uplink portion, and although the time gap is relatively short, there exists a chance that another device will begin transmitting on the shared radio frequency spectrum band during the uplink control portion and prevent the UE from transmitting on the shared radio frequency spectrum band during the uplink data portion. To mitigate the UE's risk of losing access to the shared radio frequency spectrum band, and not being able to transmit during the uplink data portion, the UE may transmit an unscheduled transmission on the shared radio frequency spectrum band during the uplink control portion. The unscheduled transmission may include a control transmission or a data transmission, and may be transmitted, for example using a physical uplink control channel (PUCCH) waveform or a physical uplink shared channel (PUSCH) waveform.

In one example, a method for wireless communication is described. The method may include receiving, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. The method may also include retaining access to the shared radio frequency spectrum band by transmitting an unscheduled transmission during the uplink control portion of the transmission structure.

In one example, a device for wireless communication is described. The device may include a processor, memory in electronic communication with the processor, and instructions stored in the memory. The instructions may be operable, when executed by the processor, to cause the apparatus to receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. The instructions may also be operable, when executed by the processor, to cause the apparatus to retain access to the shared radio frequency spectrum band by transmitting an unscheduled transmission during the uplink control portion of the transmission structure.

Some examples of the method and device described above may further include processes, features, or instructions for determining that no transmission is scheduled for the uplink control portion of the transmission structure.

Some examples of the method and device described above may further include processes, features, or instructions for transmitting the unscheduled transmission as a single bit acknowledgement of the uplink grant.

Some examples of the method and device described above may further include processes, features, or instructions for transmitting the unscheduled transmission as an unscheduled control transmission.

Some examples of the method and device described above may further include processes, features, or instructions for identifying a set of one or more channels allocated for transmitting an uplink transmission during the uplink data portion, and transmitting the unscheduled transmission on the identified set of one or more channels. In some of these examples, the set of one or more channels allocated for transmitting the uplink transmission may include a plurality of channels, the uplink transmission may include a PUSCH, and the unscheduled transmission may include a PUCCH.

Some examples of the method and device described above may further include processes, features, or instructions for transmitting the unscheduled transmission on a set of resources determined by at least one of pre-configuration information, a downlink grant, the uplink grant, resources allocated for an uplink transmission during the uplink data portion, or a combination thereof.

Some examples of the method and device described above may further include processes, features, or instructions for identifying a set of waveform parameters for transmitting a PUSCH during the uplink data portion, and the unscheduled transmission may include a PUCCH payload transmitted using the identified set of waveform parameters for transmitting the PUSCH. In some of these examples, the method and device may further include processes, features, or instructions for transmitting the unscheduled transmission on a set of resources identified in the uplink grant for transmitting an uplink transmission during the uplink data portion.

In some examples of the method and device described above, the unscheduled transmission may include a portion of a PUSCH payload transmitted on PUCCH resources allocated for the uplink control portion.

Some examples of the method and device described above may further include processes, features, or instructions for identifying a set of PUCCH resources allocated for the uplink control portion, identifying a first set of one or more waveform parameters for transmitting the PUCCH during the uplink control portion, and identifying a second set of one or more waveform parameters for transmitting a PUSCH during the uplink data portion. In some of these examples, the unscheduled transmission may be transmitted on the set of PUCCH resources using a modified PUSCH waveform based at least in part on the first set of one or more waveform parameters and the second set of one or more waveform parameters.

Some examples of the method and device described above may further include processes, features, or instructions for transmitting the unscheduled transmission as a channel reservation signal transmitted on an interlace of frequency resources allocated to bandwidth occupation transmissions.

Some examples of the method and device described above may further include processes, features, or instructions for transmitting the unscheduled transmission as a sounding reference signal (SRS).

Some examples of the method and device described above may further include processes, features, or instructions for transmitting the unscheduled transmission without contending for access to the shared radio frequency spectrum band, and contending for access to the shared radio frequency spectrum band prior to transmitting during the uplink data portion.

In some examples of the method and device described above, the unscheduled transmission may include an acknowledgement of the uplink grant, and the method and device may further include processes, features, or instructions for receiving, subsequent to the uplink data portion, a reactivation of the uplink grant.

In one example, a method for wireless communication is described. The method may include transmitting, in a downlink portion of a transmission structure on a shared radio frequency spectrum band, an uplink grant for an uplink data portion of the transmission structure. The transmission structure may include a time domain multiplexed downlink portion, followed by an uplink control portion, followed by the uplink data portion. The method may also include receiving an acknowledgement of the uplink grant during the uplink control portion of the transmission structure, determining that no transmission is received according to the uplink grant, and transmitting, subsequent to the uplink data portion, a reactivation of the uplink grant.

In one example, a device for wireless communication is described. The device may include a processor, memory in electronic communication with the processor, and instructions stored in the memory. The instructions may be operable, when executed by the processor, to cause the apparatus to transmit, in a downlink portion of a transmission structure on a shared radio frequency spectrum band, an uplink grant for an uplink data portion of the transmission structure. The transmission structure may include a time domain multiplexed downlink portion, followed by an uplink control portion, followed by the uplink data portion. The instructions may also be operable, when executed by the processor, to cause the apparatus to receive an acknowledgement of the uplink grant during the uplink control portion of the transmission structure, to determine that no transmission is received according to the uplink grant, and to transmit, subsequent to the uplink data portion, a reactivation of the uplink grant.

In some examples of the method and device described above, the reactivation of the uplink grant consists of one bit.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for enabling a user equipment (UE) to retain access to a shared radio frequency spectrum band during an uplink control portion of a transmission structure including a downlink portion, followed by and time domain multiplexed with an uplink control portion, followed by and time domain multiplexed with an uplink data portion. The techniques enable a UE to retain access to the shared radio frequency spectrum band when the UE receives an uplink grant for transmitting in the uplink data portion of the transmission structure, but no uplink grant for transmitting in the uplink control portion of the transmission structure. In these cases, the UE's lack of a scheduled transmission to transmit during the uplink control portion may allow another device to successfully contend for access to the shared radio frequency spectrum band and begin a transmission that prevents the UE from transmitting during the uplink data portion. To mitigate the chance of another device "stealing" the shared radio frequency spectrum band from the UE, the UE may transmit an unscheduled transmission during the uplink control portion of the transmission structure.

Aspects of the disclosure are initially described in the context of a wireless communication system. Aspects of the disclosure are then described in the context of transmission timelines. Aspects of the disclosure are further illustrated by and described with reference to device diagrams, system diagrams, and flowcharts that relate to retaining access to a shared radio frequency spectrum band during an uplink control portion of a transmission structure.

Figure 1:
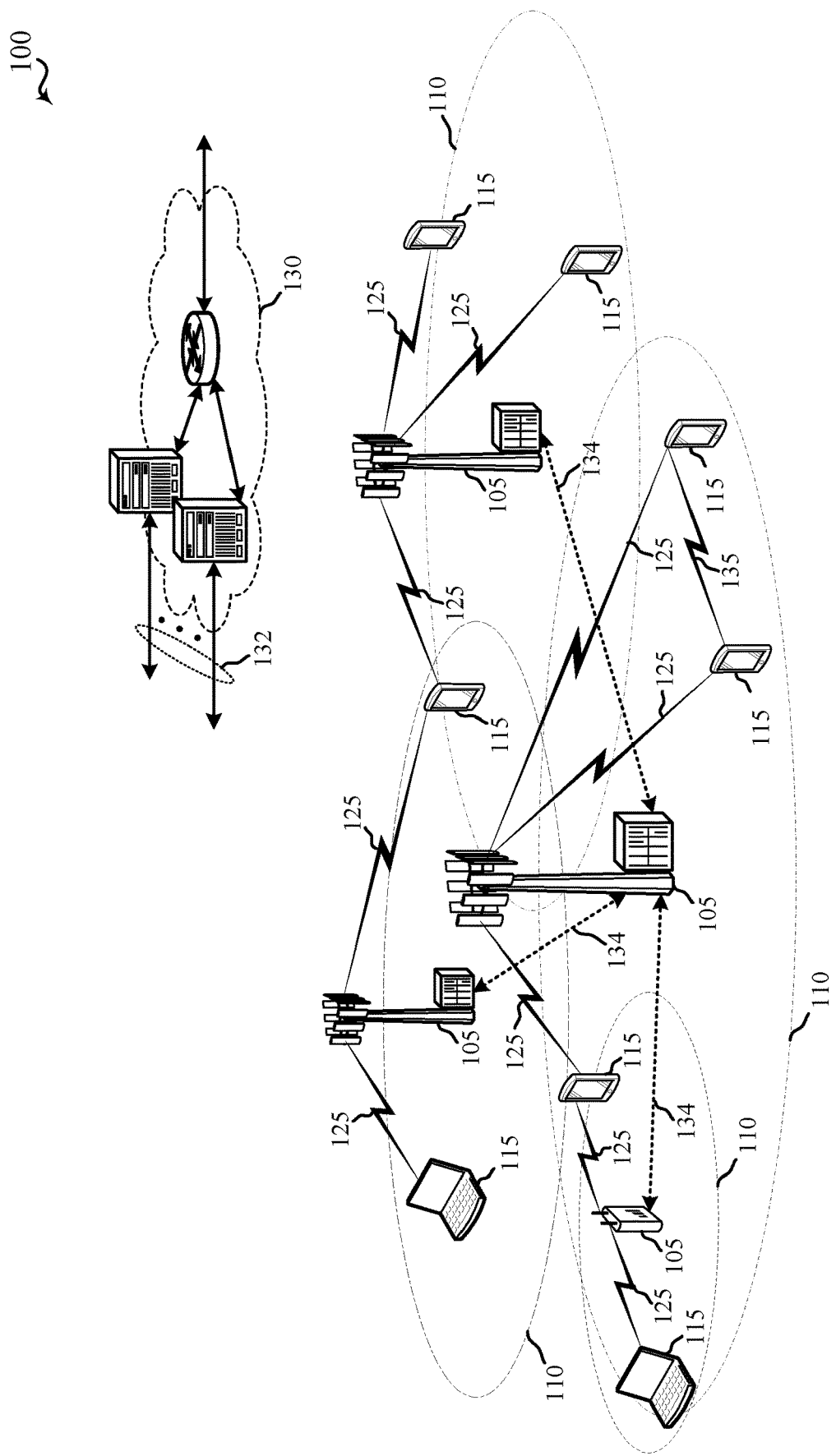
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 includes base stations 105 (a type of network access device), UEs 115, and a core network 130. In some examples, the wireless communication system 100 may include a Long Term Evolution (LTE) (or LTE-Advanced) network. As described in the present disclosure, the base stations 105 may contend for access to a shared radio frequency spectrum band prior to transmitting in a downlink portion of a transmission structure. UEs may then transmit in an uplink control portion of the transmission structure on a scheduled or unscheduled manner, and may contend for access to the shared radio frequency spectrum band before transmitting in an uplink data portion of the transmission structure (when scheduled to do so).

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. UEs 115 may be dispersed throughout the wireless communication system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Carriers may transmit bidirectional communications using frequency division duplexing (FDD) (e.g., using paired spectrum resources) or time division duplexing (TDD) (e.g., using unpaired spectrum resources). Frame structures or configurations for FDD (e.g., frame structure type 1) and TDD (e.g., frame structure type 2) may be defined. Use of TDD may offer flexible deployments without paired UL-DL spectrum resources. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL traffic (e.g., via downlink pilot time slot (DwPTS)) or UL traffic (e.g., via uplink pilot time slot (UpPTS)) and may include a Guard Period (GP) between DL and UL traffic. Switching from UL to DL traffic may be achieved by setting a timing advance (TA) at the UE 115 without the use of special subframes or a guard period.

Time intervals in LTE may be expressed in multiples of a basic time unit (e.g., the sampling period, $T_s=1/30,720,000$ seconds). Time resources may be organized according to radio frames of length of 10 ms ($T_f=307200$ Ts), which may be identified by a subframe number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods.

A frame structure may be used to organize physical resources. A frame may be a 10 ms interval that may be further divided into 10 equally sized sub-frames. Each sub-frame may include two consecutive time slots. Each slot may include six or seven orthogonal frequency division multiple access (OFDMA) symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a common reference signal (CRS) and a UE-specific RS (UE-RS). UE-RS may be transmitted on the resource blocks associated with a physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be.

A transmission time interval (TTI) may be defined as the smallest unit of time in which a base station 105 may schedule a UE 115 for UL or DL transmission. For example, if a UE 115 is receiving DL data, then during each TTI a base station 105 may assign resources and indicate (via downlink control transmissions) to the UE 115 where to look for its DL data. In some cases, a subframe may be the basic unit of scheduling or TTI. In other cases, such as with low latency operation, a different, reduced-duration TTI (e.g., a short TTI) may be used. A reduced-duration or short TTI may have a duration of a symbol period, a pair of symbol periods, a slot (i.e., half of a subframe), or other durations less than 1 ms. TTIs for low latency operation may thus have a numerology that is compatible with other LTE transmission structures and timing (e.g., subframe). The wireless communication system 100 may concurrently support communication using TTIs over different duration (e.g., TTIs having a duration of a subframe and TTIs having a duration of a symbol period or a slot).

Wireless communication system 100 may support communications according to a protocol organized into different layers. At the physical layer, a physical downlink control channel (PDCCH) may carry downlink control information (DCI) in control channel elements (CCEs), which may consist of nine logically contiguous resource element groups (REGs), where each REG contains 4 resource elements (REs). DCI includes information regarding downlink (DL) scheduling assignments, UL resource grants, transmission scheme, UL power control, hybrid automatic repeat request (HARQ) information, modulation and coding scheme (MCS) and other information. A physical uplink control channel (PUCCH) may be used for UL acknowledgements (ACKs), scheduling requests (SRs) and channel quality information (CQI) and other UL control information. A physical uplink control channel (e.g., PUCCH) may be mapped to a control channel defined by a code and two consecutive resource blocks. UL control signaling may depend on the presence of timing synchronization for a cell. PUCCH resources for scheduling request (SR) and CQI reporting may be assigned (and revoked) through radio resource control (RRC) signaling.

Within wireless communication system 100 or similar systems, HARQ may be a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). The chain of transmission, response and retransmission may be referred to as a HARQ process. HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data.

The response in a HARQ process may include an acknowledgement (ACK) indicating a successful attempt to decode information and a negative-acknowledgement (NACK) indicating a failed attempt to decode the information. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125. A time delay may determine or dictate when HARQ feedback is transmitted on the UL. That is, the TTI scheduled for HARQ feedback transmission may be associated with a predetermined delay (e.g., feedback timing) from the DL reception TTI.

To maintain synchronization with the base station 105, the UE 115 may transmit based on a timing advance (TA) value. The TA value may account for signal propagation delay due to the geographic distance between a UE 115 and the base station 105. The base station 105 or the UE 115 may determine the signal propagation delay. In an example, TA may change over time as the physical distance between a UE 115 and the base station 105 changes. When the UE 115 and base station 105 are geographically closer, the signal propagation delay may be shorter and, when geographically farther apart, the signal propagation delay may be longer. The UE 115 may use the TA value to determine when to send a signal such that the base station 105 receives the signal at the correct time along a timeline in accordance with the reception of other signals from other UEs 115.

In some cases, wireless communication system 100 may utilize enhanced component carriers (eCCs). An eCC may be characterized by one or more features including: wider bandwidth, shorter symbol duration, and shorter TTIs. For example, a 5G-NR (New Radio) carrier may be considered an eCC. In some cases, an eCC may be associated with a carrier aggregation configuration or a dual connectivity configuration (e.g., when multiple serving cells have a suboptimal or non-ideal backhaul link). An eCC may also be configured for use in an unlicensed radio frequency spectrum band or a shared radio frequency spectrum band (where more than one operator is allowed to use the radio frequency spectrum band). An eCC characterized by wide bandwidth may include one or more segments that may be utilized by UEs 115 that are not capable of monitoring the whole bandwidth or prefer to use a limited bandwidth (e.g., to conserve power).

An eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

Figure 2:
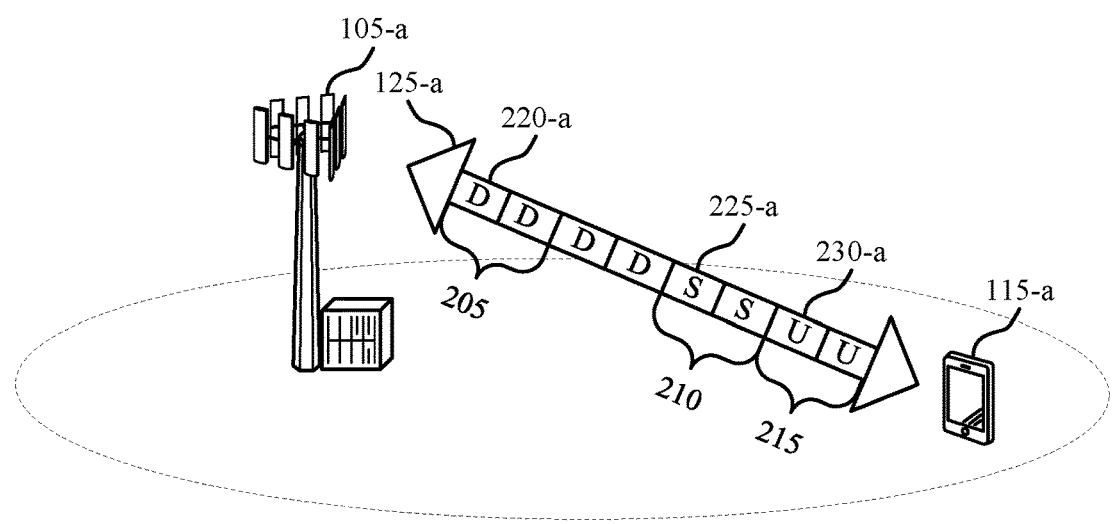
FIG. 2 illustrates an example of a wireless communication system, in accordance with various aspects of the present disclosure.

FIG. 2 illustrates an example of a wireless communication system 200, in accordance with various aspects of the present disclosure. In some cases, wireless communication system 200 may represent aspects of techniques performed by a UE 115 or base station 105 described with reference to FIG. 1.

Wireless communication system 200 may be an example of a bidirectional communication using TDD. Downlink subframes 205 (or TTIs) may in some cases include downlink (D) TTIs 220, special subframes 210 may include special (S) TTIs 225, and uplink subframes 215 may include uplink (U) TTIs 230.

HARQ feedback timing may be based on a subframe-level TTI duration or a shortened TTI duration (e.g., a slot TTI or two-symbol TTI). A shortened TTI (e.g., D TTIs 220, S TTIs 225, and U TTIs 230) may allow for reduced turnaround time and a shorter HARQ feedback delay. HARQ feedback delays associated with other wireless communication systems (e.g., predetermined time period delays associated with subframe durations) may be applied to shortened TTIs in low latency systems. The predetermined time may be a number, k, TTIs after a D TTI 220. For example, HARQ timing may follow an N+k rule where N is the D TTI 220 and N+k is the soonest TTI available for HARQ feedback (e.g., if N+k is a U TTI 230). That is, if N is D TTI 220-a and k=4, HARQ feedback may be handled by U TTI 230-a, as U TTI 230-a is the next TTI available for uplink transmissions and also satisfies the N+4 rule. In some cases, a two-symbol D TTI and one-slot U TTI system may support HARQ feedback using shortened TTIs. For example, U slot TTIs may carry two-symbol TTI transmissions from a downlink subframe 205 (e.g., U slot TTIs carry seven (7) two-symbol TTIs from a previous downlink subframe).

In some examples, an eCC transmission structure may include a downlink portion paired with an uplink portion, with the downlink portion including scheduling information (e.g., one or more downlink grants) for the downlink portion, downlink data, and scheduling information (e.g., one or more uplink grants) for the uplink portion. The uplink scheduling information may include scheduling information for data transmissions that are to be transmitted in the uplink portion. The uplink portion may include uplink control and uplink data, in which the uplink control may be implicitly scheduled by the reception of the downlink grant and contains HARQ feedback (i.e., ACK/NACK) for the downlink data. The network may also schedule channel state information (CSI) to be periodically transmitted on the uplink control.

Figure 3:
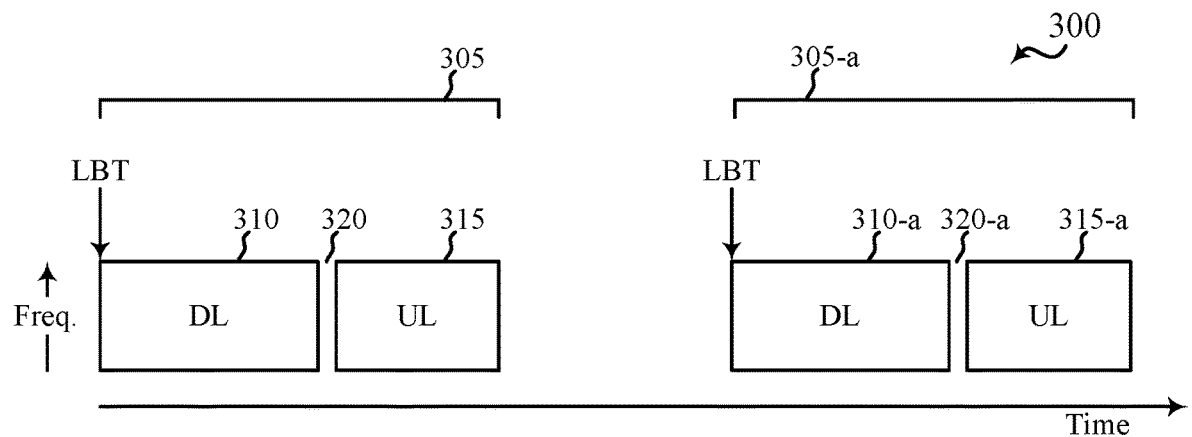
FIG. 3 shows an exemplary time-frequency representation of enhanced component carrier (eCC) transmissions in a shared radio frequency spectrum band, in accordance with various aspects of the present disclosure.

FIG. 3 shows an exemplary time-frequency representation 300 of eCC transmissions in a shared radio frequency spectrum band, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in a downlink portion 310 (or 310-a) of a transmission structure 305 (or 305-*a*) on the shared radio frequency spectrum band. The downlink portion 310 (or 310-*a*) of the transmission structure 305 (or 305-*a*) may be paired with an uplink portion 315 (or 315-*a*) of the transmission structure 305 (or 305-*a*). The uplink portion 315 (or 315-*a*) may temporally follow the downlink portion 310 (or 310-*a*), and may be separated from the downlink portion 310 (or 310-*a*) by a short inter-frame space (SIFS) 320 (or 320-*a*).

The network access device may contend for access to the shared radio frequency spectrum band, prior to transmitting in the downlink portion 310 (or 310-*a*) of the transmission structure 305 (or 305-*a*), by performing a listen before talk (LBT) procedure such as a clear channel assessment (CCA) procedure or an enhanced CCA (eCCA) procedure. When the network access device performs a LBT procedure and determines the shared radio frequency spectrum band is clear for access, the network access device may transmit a downlink transmission in the downlink portion 310 (or 310-*a*) of the transmission structure 305 (or 305-*a*). When the network access device performs a LBT procedure and determines the shared radio frequency spectrum band is not clear for access, the network access device may not transmit a downlink transmission in the downlink portion 310 (or 310-*a*) of the transmission structure 305 (or 305-*a*). In some examples, a UE that receives scheduling information (e.g., one or more uplink grants) in the downlink portion 310 (or 310-*a*) of the transmission structure 305 (or 305-*a*) may transmit an uplink transmission, in the uplink portion 315 (or 315-*a*) of the transmission structure 305 (or 305-*a*), without performing an additional LBT procedure.

An uplink transmission may include, for example, one or more of control transmissions, such as ACK/NACK transmissions transmitted on a PUCCH, in which the ACK/NACK transmissions acknowledge or do not acknowledge a PDSCH received in a downlink transmission; channel state information (CSI) feedback scheduled for transmission on a PUCCH; or CSI feedback transmitted on a physical uplink shared channel (PUSCH) in response to a CQI request on a PDCCH received in a downlink transmission. The uplink transmissions may also or alternatively include, for example, a PUSCH transmission scheduled by a PDCCH received in a downlink transmission (e.g., in an uplink grant).

Figure 4:
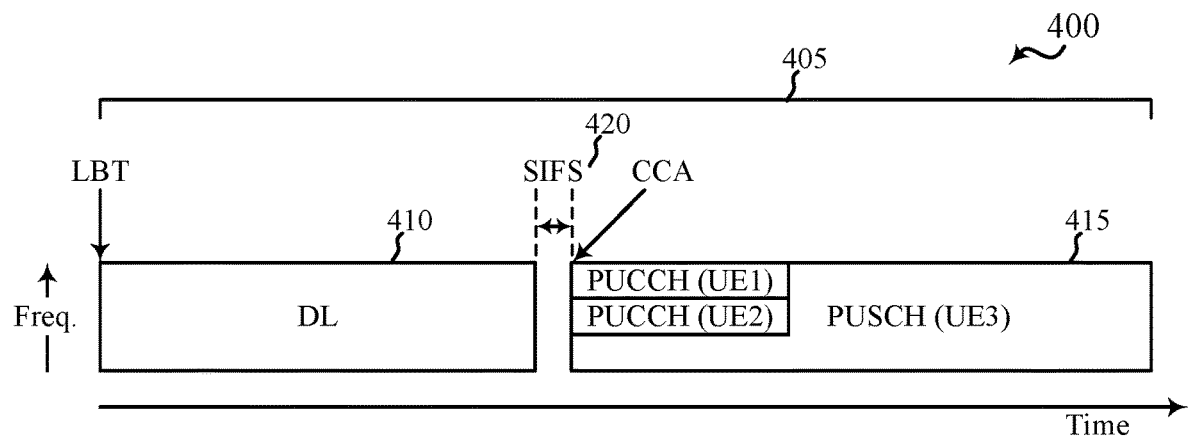
FIG. 4 shows an exemplary time-frequency representation of eCC transmissions in a shared radio frequency spectrum band, in accordance with various aspects of the present disclosure.

FIG. 4 shows an exemplary time-frequency representation 400 of eCC transmissions in a shared radio frequency spectrum band, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in a downlink portion 410 of a transmission structure 405 on the shared radio frequency spectrum band. The downlink portion 410 of the transmission structure 405 may be paired with an uplink portion 415 of the transmission structure 405. The uplink portion 415 may temporally follow the downlink portion 410, and may be separated from the downlink portion 410 by a SIFS 420. The transmission structure 405 may be an example of aspects of the transmission structure 305 described with reference to FIG. 3.

The network access device may contend for access to the shared radio frequency spectrum band, prior to transmitting in the downlink portion 410 of the transmission structure 405, by performing a LBT procedure such as a CCA procedure or an eCCA procedure. In some examples, a UE that receives scheduling information (e.g., one or more uplink grants) in the downlink portion 410 of the transmission structure 405 may transmit an uplink transmission, in the uplink portion 415 of the transmission structure 405, without performing an additional LBT procedure.

An uplink transmission may include, for example, a control transmission and/or a data transmission, as described with reference to FIG. 3. FIG. 4 shows an uplink portion 415 in which a network access device has scheduled a PUCCH transmission from a first UE (UE1), a PUCCH transmission from a second UE (UE2), and a PUSCH transmission from a third UE (UE3). The PUCCH and PUSCH transmissions may be scheduled using frequency domain multiplexing (FDM) techniques. In some examples, the PUCCH transmissions may occupy one, two, or a few of the earliest-transmitted transmission time intervals (TTIs) or symbol periods of the uplink portion 415. The PUSCH transmission may occupy each of the TTIs or subframes of the uplink portion 415.

Figure 5:
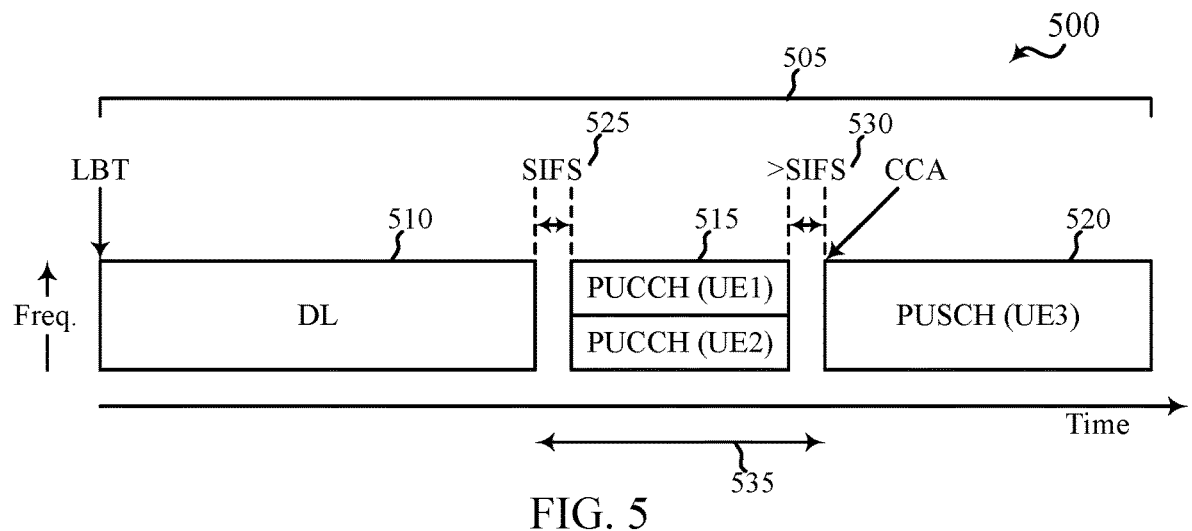
FIG. 5 shows an exemplary time-frequency representation of eCC transmissions in a shared radio frequency spectrum band, in accordance with various aspects of the present disclosure.

FIG. 5 shows an exemplary time-frequency representation 500 of eCC transmissions in a shared radio frequency spectrum band, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in a downlink portion 510 of a transmission structure 505 on the shared radio frequency spectrum band. The downlink portion 510 of the transmission structure 505 may be paired with an uplink control portion 515 of the transmission structure 505 and an uplink data portion 520 of the transmission structure 505. The uplink control portion 515 may temporally follow the downlink portion 510, and may be separated from the downlink portion 510 by a SIFS 525. The uplink data portion 520 may temporally follow the uplink control portion 515, and may be separated from the uplink control portion 515 by more than a SIFS (e.g., a fixed 25 µsec gap 530). Thus, the downlink portion 510, the uplink control portion 515, and the uplink data portion 520 are scheduled using time domain multiplexing (TDM) techniques.

The network access device may contend for access to the shared radio frequency spectrum band, prior to transmitting in the downlink portion 510 of the transmission structure 505, by performing a LBT procedure such as a CCA procedure or an eCCA procedure. In some examples, a UE that has a scheduled control transmission in the uplink control portion 515 may transmit the control transmission in the uplink control portion 515 without performing an additional LBT procedure. Here, the schedule control transmission in the uplink control portion 515 may be either due to the downlink grant received in the downlink portion 510 or other scheduled uplink control instances such as periodic CSI. However, a UE that receives uplink scheduling information (e.g., one or more uplink grants) in the downlink portion 510 of the transmission structure 505, for transmitting a data transmission in the uplink data portion 520, may be required to perform an additional LBT procedure before transmitting the data transmission in the uplink data portion 520 of the transmission structure 505. In some examples, the LBT procedure performed by the network access device before transmitting in the downlink portion 510 may have a longer duration than the LBT procedure performed by the UE before transmitting in the uplink data portion 520. For example, the LBT procedure performed by the network access device may be a Category 4 LBT procedure, and the LBT procedure performed by the UE may be a 25 μsec single-slot CCA procedure.

FIG. 5 shows an uplink control portion 515, in which a network access device has scheduled a PUCCH transmission from a first UE (UE1) and a PUCCH transmission from a second UE (UE2) using FDM techniques. In some examples, the uplink control portion may occupy one, two, or a few TTIs or symbol periods (e.g., the uplink control portion 515 may have a duration of 200 μsec or a "CCA-exempt duration").

FIG. 5 also shows an uplink data portion 520, in which the network access device has scheduled a PUSCH transmission from a third UE (UE3). UEs that have both a scheduled PUCCH and PUSCH can transmit the PUCCH and the PUSCH in a TDM manner.

A UE that is scheduled to transmit in the uplink data portion 520 but which is not scheduled to transmit in the uplink control portion 515, or a UE that is scheduled to transmit in both the uplink control portion 515 and the uplink data portion 520, but which does not have a control transmission (e.g., an ACK/NACK or periodic CQI) to transmit in the uplink control portion 515, may not transmit on the shared radio frequency spectrum band for a duration 535. As a result, there is an increased probability that a nearby node (e.g., a Wi-Fi station) may determine the shared radio frequency spectrum band is available, begin a transmit over the shared radio frequency spectrum band, and cause the LBT procedure performed by the UE prior to transmitting in the uplink data portion 520 to fail. One may argue that this problem could be avoided if the network access device could schedule the PUSCH transmission from UE3 to begin during the uplink control portion 515. However, note that the PUSCH transmission, which has a duration that exceeds the CCA-exempt duration, requires a larger time gap (e.g., 25 usec) for performing an LBT procedure than a PUCCH transmission (which requires only SIFS=16 msec). Therefore, by the time UE3 attempts an LBT procedure for transmission of a PUSCH, the UE3 will see interference from a PUCCH transmission from UE1 and UE2, which will cause the LBT procedure to fail. Thus, the UE3 will not be able to transmit a PUSCH. Therefore, it may not be desirable for the network access device to schedule the PUSCH transmission of the UE3 from the beginning of the uplink control portion.

Figure 6:
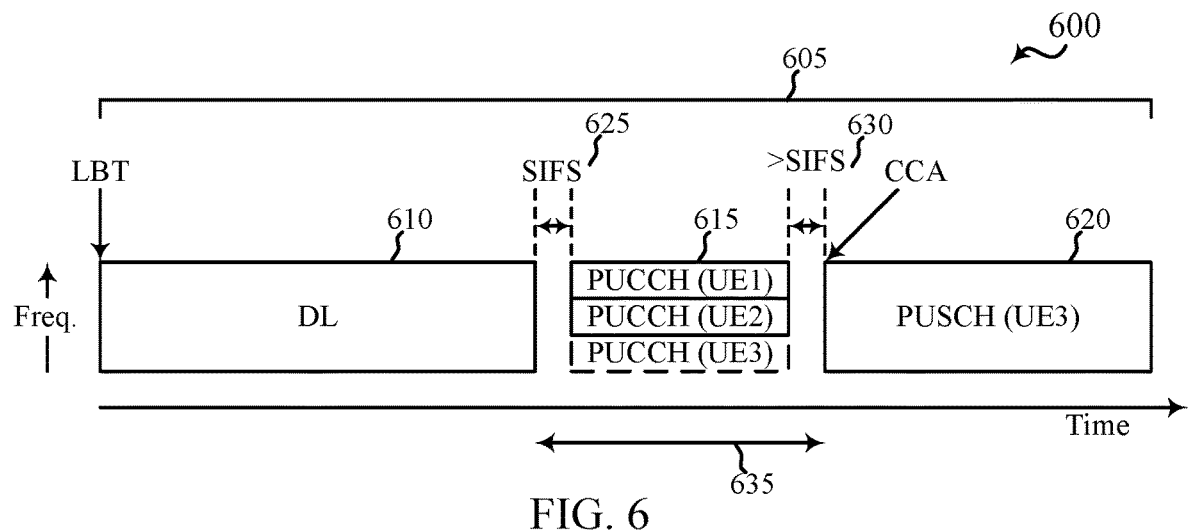
FIG. 6 shows an exemplary time-frequency representation of eCC transmissions in a shared radio frequency spectrum band, in which a user equipment (UE) retains access to the shared radio frequency spectrum band between a downlink portion of a transmission structure and an uplink data portion of the transmission structure by transmitting an unscheduled transmission, in accordance with various aspects of the present disclosure.

FIG. 6 shows an exemplary time-frequency representation 600 of eCC transmissions in a shared radio frequency spectrum band, in which a UE retains access to the shared radio frequency spectrum band between a downlink portion 610 of a transmission structure 605 and an uplink data portion 620 of the transmission structure 605 by transmitting an unscheduled transmission, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in the downlink portion 610 of the transmission structure 605. The downlink portion 610 of the transmission structure 605 may be paired with an uplink control portion 615 of the transmission structure 605 and the uplink data portion 620 of the transmission structure 605. The uplink control portion 615 may temporally follow the downlink portion 610, and may be separated from the downlink portion 610 by a SIFS 625. The uplink data portion 620 may temporally follow the uplink control portion 615, and may be separated from the uplink control portion 615 by more than a SIFS (e.g., a fixed 25 μsec gap 630). Thus, the downlink portion 610, the uplink control portion 615, and the uplink data portion 620 are scheduled using TDM techniques. The transmission structure 605 may be an example of aspects of the transmission structure 505 described with reference to FIG. 5.

The network access device may contend for access to the shared radio frequency spectrum band, prior to transmitting in the downlink portion 610 of the transmission structure 605, by performing a LBT procedure such as a CCA procedure or an eCCA procedure. In some examples, a UE that is scheduled to transmit an uplink control may transmit the control transmission in the uplink control portion 615 without performing an additional LBT procedure. However, a UE that receives uplink scheduling information (e.g., one or more uplink grants) in the downlink portion 610 of the transmission structure 605, for transmitting a data transmission in the uplink data portion 620, may be required to perform an additional LBT procedure before transmitting the data transmission in the uplink data portion 620 of the transmission structure 605. In some examples, the LBT procedure performed by the network access device before transmitting in the downlink portion 610 may have a longer duration than the LBT procedure performed by the UE before transmitting in the uplink data portion 620. For example, the LBT procedure performed by the network access device may be a Cat 4 LBT procedure, and the LBT procedure performed by the UE may be a 25 μsec single-slot CCA procedure.

FIG. 6 shows an uplink control portion 615, in which a network access device has scheduled a PUCCH transmission from a first UE (UE1) and a PUCCH transmission from a second UE (UE2) using FDM techniques. In some examples, the uplink control portion may occupy one, two, or a few TTIs or symbol periods (e.g., the uplink control portion 615 may have a duration of 200 μsec or a "CCA-exempt duration").

FIG. 6 also shows an uplink data portion 620, in which the network access device has scheduled a PUSCH transmission from a third UE (UE3). Because UE3 is scheduled to transmit in the uplink data portion 620 but not the uplink control portion 615, UE3 may not transmit on the shared radio frequency spectrum band for a duration 635. Upon UE3 determining that it has no transmission scheduled for the uplink control portion 615 of the transmission structure 605, and to retain access to the shared radio frequency spectrum band for the duration 635, UE3 may transmit an unscheduled control transmission (e.g., an unscheduled PUCCH) during the uplink control portion 615. In some examples, the unscheduled control transmission (e.g., the unscheduled PUCCH) may include an acknowledgement (e.g., a single bit acknowledgement) of the uplink grant for the uplink data portion 620. In some examples, the unscheduled control transmission (e.g., the unscheduled PUCCH) may include at least one of a CQI, a BSR, or a measurement. That is, a UE may use the unscheduled control transmission as an opportunity to transmit QCI, a BSR, or measurements that were not solicited/scheduled by a network access device. In some examples, the unscheduled control transmission may be transmitted on resources allocated by the network access device for the unscheduled control transmission.

When the network access device receives an acknowledgement of UE3's uplink grant for transmitting in the uplink data portion 620, but does not receive a PUSCH from UE3 during the uplink data portion 620, the acknowledgement of UE3's uplink grant may enable the network access device to determine that UE3 received its uplink grant for transmitting a PUSCH during the uplink data portion 620 but was unable to access the shared radio frequency spectrum band following performance of a LBT procedure prior to the uplink data portion 620. In some examples, the network access device may transmit a reactivation of UE3's uplink grant under such conditions. In some examples, the reactivation of the uplink grant may consist of one bit (i.e., a 1-bit trigger that does not include the entire content of the uplink grant).

When the PUSCH transmission from UE3 is scheduled on a single channel (e.g., a single 20 MHz channel), UE3 may transmit its unscheduled control transmission (e.g., the unscheduled PUCCH) on the same channel. When the PUSCH transmission from UE3 is scheduled on multiple channels (e.g., multiple 20 MHz channels), UE3 may transmit its unscheduled control transmission on each of the channels.

UE3 may identify the resources on which it transmits its unscheduled control transmission as a function of: preconfiguration information, a downlink grant, an uplink grant, resources allocated to UE3 for its transmission of a PUSCH in the uplink data portion 620, or a combination thereof.

Figure 7:
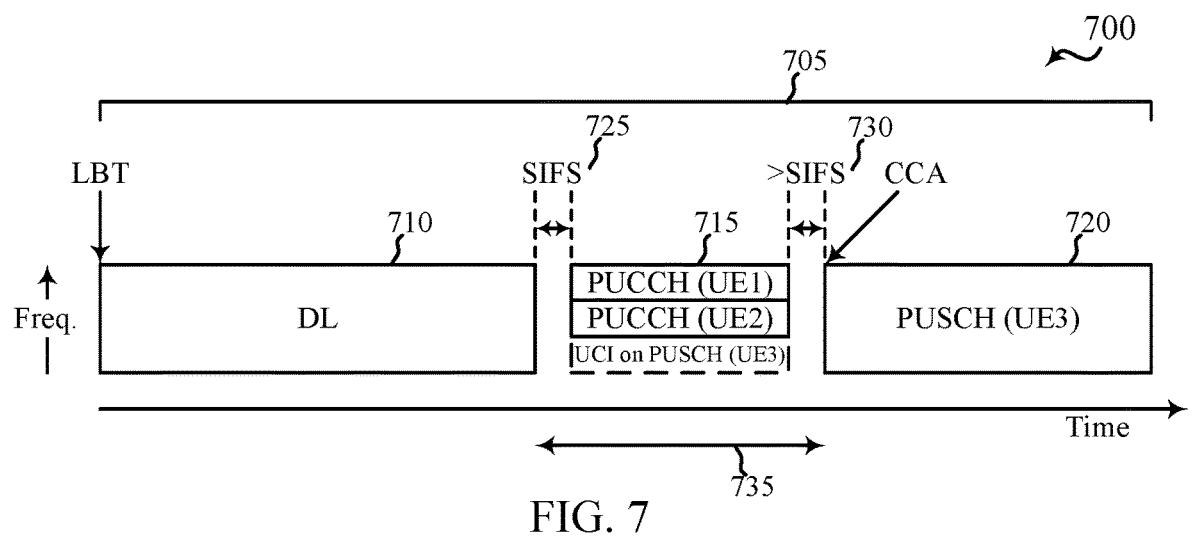
FIG. 7 shows an exemplary time-frequency representation of eCC transmissions in a shared radio frequency spectrum band, in which a UE retains access to the shared radio frequency spectrum band between a downlink portion of a transmission structure and an uplink data portion of the transmission structure by transmitting an unscheduled transmission, in accordance with various aspects of the present disclosure.

FIG. 7 shows an exemplary time-frequency representation 700 of eCC transmissions in a shared radio frequency spectrum band, in which a UE retains access to the shared radio frequency spectrum band between a downlink portion 710 of a transmission structure 705 and an uplink data portion 720 of the transmission structure 705 by transmitting an unscheduled transmission, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in the downlink portion 710 of the transmission structure 705. The downlink portion 710 of the transmission structure 705 may be paired with an uplink control portion 715 of the transmission structure 705 and the uplink data portion 720 of the transmission structure 705. The uplink control portion 715 may temporally follow the downlink portion 710, and may be separated from the downlink portion 710 by a SIFS 725. The uplink data portion 720 may temporally follow the uplink control portion 715, and may be separated from the uplink control portion 715 by more than a SIFS (e.g., a fixed 25 μsec gap 730). Thus, the downlink portion 710, the uplink control portion 715, and the uplink data portion 720 are scheduled using TDM techniques. The transmission structure 705 may be an example of aspects of the transmission structure 505 described with reference to FIG. 5.

The network access device may contend for access to the shared radio frequency spectrum band, prior to transmitting in the downlink portion 710 of the transmission structure 705, by performing a LBT procedure such as a CCA procedure or an eCCA procedure. In some examples, a UE that receives scheduling information (e.g., one or more uplink grants) in the downlink portion 710 of the transmission structure 705, for transmitting a control transmission in the uplink control portion 715, may transmit the control transmission in the uplink control portion 715 without performing an additional LBT procedure. However, a UE that receives scheduling information (e.g., one or more uplink grants) in the downlink portion 710 of the transmission structure 705, for transmitting a data transmission in the uplink data portion 720, may be required to perform an additional LBT procedure before transmitting the data transmission in the uplink data portion 720 of the transmission structure 705. In some examples, the LBT procedure performed by the network access device before transmitting in the downlink portion 710 may have a longer duration than the LBT procedure performed by the UE before transmitting in the uplink data portion 720. For example, the LBT procedure performed by the network access device may be a Cat 4 LBT procedure, and the LBT procedure performed by the UE may be a 25 μsec single-slot CCA procedure.

FIG. 7 shows an uplink control portion 715, in which a network access device has scheduled a PUCCH transmission from a first UE (UE1) and a PUCCH transmission from a second UE (UE2) using FDM techniques. In some examples, the uplink control portion may occupy one, two, or a few TTIs or symbol periods (e.g., the uplink control portion 715 may have a duration of 200 μsec or a "CCA-exempt duration").

FIG. 7 also shows an uplink data portion 720, in which the network access device has scheduled a PUSCH transmission from a third UE (UE3). Because UE3 is scheduled to transmit in the uplink data portion 720 but not the uplink control portion 715, UE3 may not transmit on the shared radio frequency spectrum band for a duration 735. Upon determining that no transmission is scheduled for the uplink control portion 715 of the transmission structure 705, and to retain access to the shared radio frequency spectrum band for the duration 735, UE3 may transmit an unscheduled control transmission (e.g., uplink control information (UCI)) during the uplink control portion 715. In some examples, the unscheduled control transmission (e.g., the UCI) may include an acknowledgement (e.g., a single bit acknowledgement) of the uplink grant for the uplink data portion 720. In some examples, the unscheduled control transmission (e.g., the UCI) may include at least one of a CQI, a BSR, or a measurement. In some examples, the unscheduled control transmission may be transmitted on resources allocated by the network access device for the unscheduled control transmission.

In FIG. 6, it was assumed that the unscheduled control transmission was transmitted using a set of waveform parameters for transmitting a PUCCH. In FIG. 7, the unscheduled control transmission may include a PUCCH payload (e.g., UCI) transmitted using a set of waveform parameters (e.g., a modulation and coding scheme (MCS)) for transmitting a PUSCH. UE3 may identify the resources on which it transmits its unscheduled control transmission as a function of the resources allocated to UE3 for its transmission of a PUSCH in the uplink data portion 720. Resources reserved for PUCCH transmissions during the uplink control portion 715 may not be used to transmit the unscheduled control transmission (e.g., the UCI). Transmitting the unscheduled control transmission using a set of waveform parameters for transmitting a PUSCH may enable UE3 to transmit at a higher code rate (e.g., using quadrature phase-shift keying (QPSK)), a higher rank, etc., because a PUSCH is rate-controlled by a network access device based on a UE's channel quality, whereas PUCCH waveform parameters may be generic to cover UEs near an edge of a cell.

Figure 8:
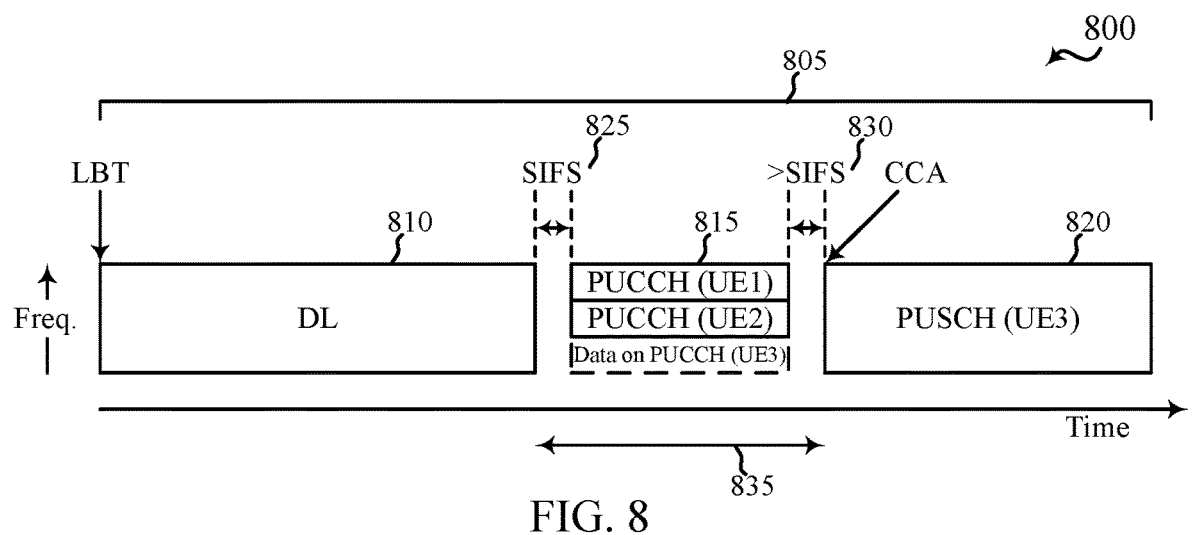
FIG. 8 shows an exemplary time-frequency representation of eCC transmissions in a shared radio frequency spectrum band, in which a UE retains access to the shared radio frequency spectrum band between a downlink portion of a transmission structure and an uplink data portion of the transmission structure by transmitting an unscheduled transmission, in accordance with various aspects of the present disclosure.

FIG. 8 shows an exemplary time-frequency representation 800 of eCC transmissions in a shared radio frequency spectrum band, in which a UE retains access to the shared radio frequency spectrum band between a downlink portion 810 of a transmission structure 805 and an uplink data portion 820 of the transmission structure 805 by transmitting an unscheduled transmission, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in the downlink portion 810 of the transmission structure 805. The downlink portion 810 of the transmission structure 805 may be paired with an uplink control portion 815 of the transmission structure 805 and the uplink data portion 820 of the transmission structure 805. The uplink control portion 815 may temporally follow the downlink portion 810, and may be separated from the downlink portion 810 by a SIFS 825. The uplink data portion 820 may temporally follow the uplink control portion 815, and may be separated from the uplink control portion 815 by more than a SIFS (e.g., a fixed 25 μsec gap 830). Thus, the downlink portion 810, the uplink control portion 815, and the uplink data portion 820 are scheduled using TDM techniques. The transmission structure 805 may be an example of aspects of the transmission structure 505 described with reference to FIG. 5.

The network access device may contend for access to the shared radio frequency spectrum band, prior to transmitting in the downlink portion 810 of the transmission structure 805, by performing a LBT procedure such as a CCA procedure or an eCCA procedure. In some examples, a UE that receives scheduling information (e.g., one or more uplink grants) in the downlink portion 810 of the transmission structure 805, for transmitting a control transmission in the uplink control portion 815, may transmit the control transmission in the uplink control portion 815 without performing an additional LBT procedure. However, a UE that receives scheduling information (e.g., one or more uplink grants) in the downlink portion 810 of the transmission structure 805, for transmitting a data transmission in the uplink data portion 820, may be required to perform an additional LBT procedure before transmitting the data transmission in the uplink data portion 820 of the transmission structure 805. In some examples, the LBT procedure performed by the network access device before transmitting in the downlink portion 810 may have a longer duration than the LBT procedure performed by the UE before transmitting in the uplink data portion 820. For example, the LBT procedure performed by the network access device may be a Cat 4 LBT procedure, and the LBT procedure performed by the UE may be a 25 μsec single-slot CCA procedure.

FIG. 8 shows an uplink control portion 815, in which a network access device has scheduled a PUCCH transmission from a first UE (UE1) and a PUCCH transmission from a second UE (UE2) using FDM techniques. In some examples, the uplink control portion may occupy one, two, or a few TTIs or symbol periods (e.g., the uplink control portion 815 may have a duration of 200 μsec or a "CCA-exempt duration").

FIG. 8 also shows an uplink data portion 820, in which the network access device has scheduled a PUSCH transmission from a third UE (UE3). Because UE3 is scheduled to transmit in the uplink data portion 820 but not the uplink control portion 815, UE3 may not transmit on the shared radio frequency spectrum band for a duration 835. Upon determining that no transmission is scheduled for the uplink control portion 815 of the transmission structure 805, and to retain access to the shared radio frequency spectrum band for the duration 835, UE3 may transmit an unscheduled data transmission (e.g., a portion of a PUSCH payload) during the uplink control portion 815. In some examples, the unscheduled data transmission (e.g., the portion of the PUSCH payload) may be transmitted on resources allocated by the network access device for the unscheduled data transmission.

UE3 may transmit the unscheduled data transmission (e.g., the portion of the PUSCH payload) on a set of PUCCH resources (e.g., an interlace of frequency resources that may be allocated to a PUCCH) using a set of one or more parameters (e.g., a spreading sequence) for transmitting the PUCCH during the uplink control portion 815. Transmitting an unscheduled data transmission using PUCCH resources and PUSCH waveform parameters may improve data transmission efficiencies and enable a transmission of a somewhat larger PUSCH, in a manner that reduces interference with PUCCH transmissions of other UEs.

Figure 9:
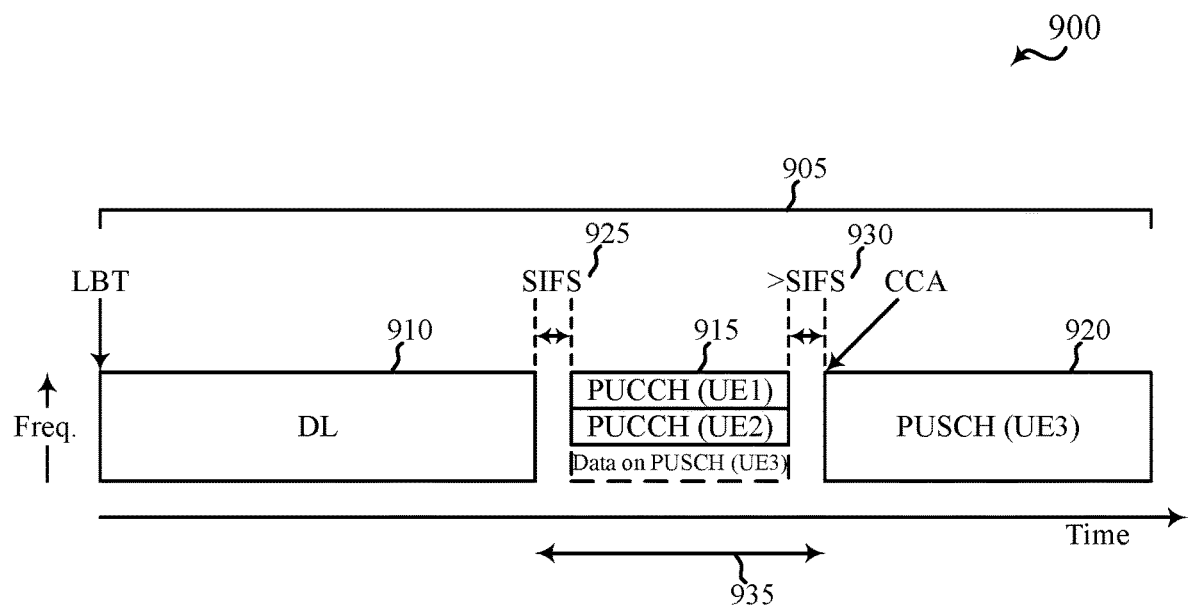
FIG. 9 shows an exemplary time-frequency representation of eCC transmissions in a shared radio frequency spectrum band, in which a UE retains access to the shared radio frequency spectrum band between a downlink portion of a transmission structure and an uplink data portion of the transmission structure by transmitting an unscheduled transmission, in accordance with various aspects of the present disclosure.

FIG. 9 shows an exemplary time-frequency representation 900 of eCC transmissions in a shared radio frequency spectrum band, in which a UE retains access to the shared radio frequency spectrum band between a downlink portion 910 of a transmission structure 905 and an uplink data portion 920 of the transmission structure 905 by transmitting an unscheduled transmission, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in the downlink portion 910 of the transmission structure 905. The downlink portion 910 of the transmission structure 905 may be paired with an uplink control portion 915 of the transmission structure 905 and the uplink data portion 920 of the transmission structure 905. The uplink control portion 915 may temporally follow the downlink portion 910, and may be separated from the downlink portion 910 by a SIFS 925. The uplink data portion 920 may temporally follow the uplink control portion 915, and may be separated from the uplink control portion 915 by more than a SIFS (e.g., a fixed 25 μsec gap 930). Thus, the downlink portion 910, the uplink control portion 915, and the uplink data portion 920 are scheduled using TDM techniques. The transmission structure 905 may be an example of aspects of the transmission structure 505 described with reference to FIG. 5.

The network access device may contend for access to the shared radio frequency spectrum band, prior to transmitting in the downlink portion 910 of the transmission structure 905, by performing a LBT procedure such as a CCA procedure or an eCCA procedure. In some examples, a UE that receives scheduling information (e.g., one or more uplink grants) in the downlink portion 910 of the transmission structure 905, for transmitting a control transmission in the uplink control portion 915, may transmit the control transmission in the uplink control portion 915 without performing an additional LBT procedure. However, a UE that receives scheduling information (e.g., one or more uplink grants) in the downlink portion 910 of the transmission structure 905, for transmitting a data transmission in the uplink data portion 920, may be required to perform an additional LBT procedure before transmitting the data transmission in the uplink data portion 920 of the transmission structure 905. In some examples, the LBT procedure performed by the network access device before transmitting in the downlink portion 910 may have a longer duration than the LBT procedure performed by the UE before transmitting in the uplink data portion 920. For example, the LBT procedure performed by the network access device may be a Cat 4 LBT procedure, and the LBT procedure performed by the UE may be a 25 µsec single-slot CCA procedure.

FIG. 9 shows an uplink control portion 915, in which a network access device has scheduled a PUCCH transmission from a first UE (UE1) and a PUCCH transmission from a second UE (UE2) using FDM techniques. In some examples, the uplink control portion may occupy one, two, or a few TTIs or symbol periods (e.g., the uplink control portion 915 may have a duration of 200 µsec or a "CCA-exempt duration").

FIG. 9 also shows an uplink data portion 920, in which the network access device has scheduled a PUSCH transmission from a third UE (UE3). Because UE3 is scheduled to transmit in the uplink data portion 920 but not the uplink control portion 915, UE3 may not transmit on the shared radio frequency spectrum band for a duration 935. Upon determining that no transmission is scheduled for the uplink control portion 915 of the transmission structure 905, and to retain access to the shared radio frequency spectrum band for the duration 935, UE3 may transmit an unscheduled data transmission (e.g., a portion of a PUSCH payload) during the uplink control portion 915. In some examples, the unscheduled data transmission (e.g., the portion of the PUSCH payload) may be transmitted on resources allocated by the network access device for the unscheduled data transmission.

In FIG. 8, the unscheduled data transmission was transmitted on a set of PUCCH resources using a set of one or more waveform parameters for transmitting a PUCCH. In FIG. 9, UE3 may transmit the unscheduled data transmission (e.g., the portion of the PUSCH payload) on a set of PUCCH resources (e.g., an interlace of frequency resources that may be allocated to a PUCCH) using a modified PUSCH waveform. The modified PUSCH waveform may be based at least in part on a first set of one or more waveform parameters for transmitting a PUCCH during the uplink control portion 815 and a second set of one or more waveform parameters for transmitting a PUSCH during the uplink data portion 820. The modified PUSCH waveform may be based at least in part on an encoding scheme included in the first set of waveform parameters (e.g., a tailbiting convolutional code (TBCC)) or an encoding scheme included in the second set of waveform parameters (e.g., a turbo code (TC) or low-density parity-check (LDPC) code). In some examples, the modified PUSCH waveform may also be based on waveform parameters such as an MCS, beamforming parameter, diversity parameter, or precoding parameter included in the second set of waveform parameters. In some examples, an MCS, beamforming parameter, diversity parameter, or precoding parameter used for the modified PUSCH waveform may be indicated in, or derived from, an uplink grant for UE3's uplink transmission during the uplink data portion 920. In some examples, the rank used for the modified PUSCH waveform may be restricted to rank 1.

Transmitting an unscheduled data transmission using PUCCH resources and a modified PUSCH waveform may improve data transmission efficiencies and enable a transmission of a somewhat larger PUSCH, in a manner that increases transmission capacity over transmitting an unscheduled data transmission as described in FIG. 8.

Figure 10:
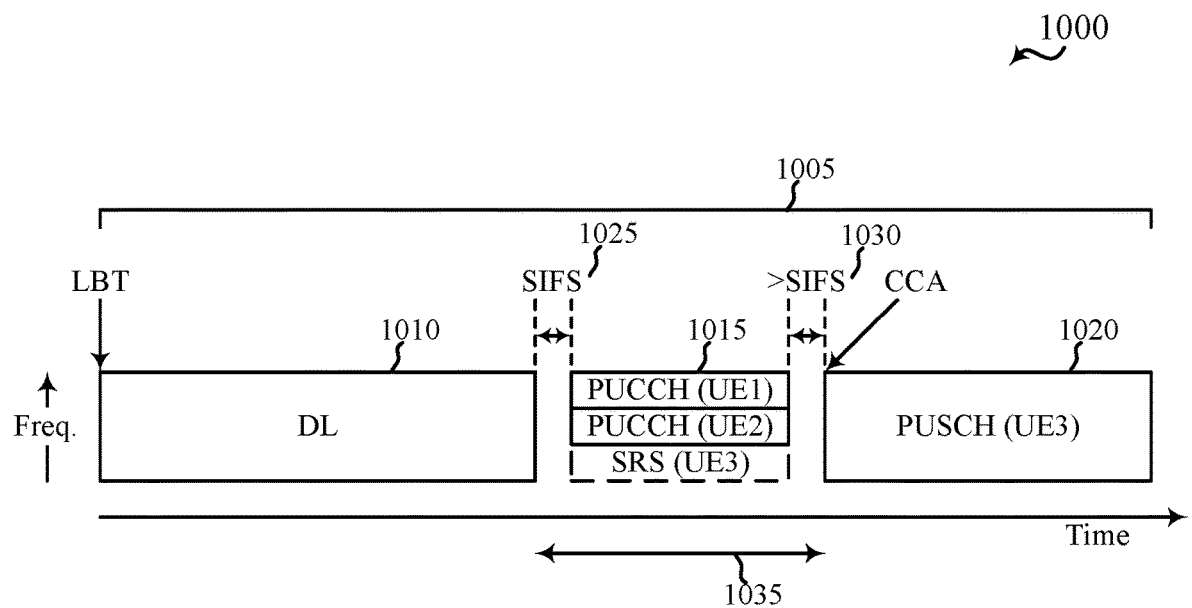
FIG. 10 shows an exemplary time-frequency representation of eCC transmissions in a shared radio frequency spectrum band, in which a UE retains access to the shared radio frequency spectrum band between a downlink portion of a transmission structure and an uplink data portion of the transmission structure by transmitting an unscheduled transmission, in accordance with various aspects of the present disclosure.

FIG. 10 shows an exemplary time-frequency representation 1000 of eCC transmissions in a shared radio frequency spectrum band, in which a UE retains access to the shared radio frequency spectrum band between a downlink portion 1010 of a transmission structure 1005 and an uplink data portion 1020 of the transmission structure 1005 by transmitting an unscheduled transmission, in accordance with various aspects of the present disclosure. In some examples, the eCC transmissions may be transmitted between a network access device and one or more UEs (e.g., between one of the base stations 105 and one or more of the UEs 115 described with reference to FIG. 1 or 2.

In some examples, a network access device may contend for access to the shared radio frequency spectrum band before transmitting a downlink transmission in the downlink portion 1010 of the transmission structure 1005. The downlink portion 1010 of the transmission structure 1005 may be paired with an uplink control portion 1015 of the transmission structure 1005 and the uplink data portion 1020 of the transmission structure 1005. The uplink control portion 1015 may temporally follow the downlink portion 1010, and may be separated from the downlink portion 1010 by a SIFS 1025. The uplink data portion 1020 may temporally follow the uplink control portion 1015, and may be separated from the uplink control portion 1015 by more than a SIFS (e.g., a fixed 25 µsec gap 1030). Thus, the downlink portion 1010, the uplink control portion 1015, and the uplink data portion 1020 are scheduled using TDM techniques. The transmission structure 1005 may be an example of aspects of the transmission structure 505 described with reference to FIG. 5.

The network access device may contend for access to the shared radio frequency spectrum band, prior to transmitting in the downlink portion 1010 of the transmission structure 1005, by performing a LBT procedure such as a CCA procedure or an eCCA procedure. In some examples, a UE that receives scheduling information (e.g., one or more uplink grants) in the downlink portion 1010 of the transmission structure 1005, for transmitting a control transmission in the uplink control portion 1015, may transmit the control transmission in the uplink control portion 1015 without performing an additional LBT procedure. However, a UE that receives scheduling information (e.g., one or more uplink grants) in the downlink portion 1010 of the transmission structure 1005, for transmitting a data transmission in the uplink data portion 1020, may be required to perform an additional LBT procedure before transmitting the data transmission in the uplink data portion 1020 of the transmission structure 1005. In some examples, the LBT procedure performed by the network access device before transmitting in the downlink portion 1010 may have a longer duration than the LBT procedure performed by the UE before transmitting in the uplink data portion 1020. For example, the LBT procedure performed by the network access device may be a Cat 4 LBT procedure, and the LBT procedure performed by the UE may be a 25 µsec single-slot CCA procedure.

FIG. 10 shows an uplink control portion 1015, in which a network access device has scheduled a PUCCH transmission from a first UE (UE1) and a PUCCH transmission from a second UE (UE2) using FDM techniques. In some examples, the uplink control portion may occupy one, two, or a few TTIs or symbol periods (e.g., the uplink control portion 1015 may have a duration of 200 µsec or a "CCA-exempt duration").

FIG. 10 also shows an uplink data portion 1020, in which the network access device has scheduled a PUSCH transmission from a third UE (UE3). Because UE3 is scheduled to transmit in the uplink data portion 1020 but not the uplink control portion 1015, UE3 may not transmit on the shared radio frequency spectrum band for a duration 1035. Upon determining that no transmission is scheduled for the uplink control portion 1015 of the transmission structure 1005, and to retain access to the shared radio frequency spectrum band for the duration 1035, UE3 may transmit a sounding reference signal (SRS) during the uplink control portion 1015. In some examples, the SRS may be transmitted on resources allocated by the network access device for the SRS. In some examples, UE3 may transmit the SRS on a set of PUCCH resources (e.g., an interlace of frequency resources that may be allocated to a PUCCH).

As an alternative to transmitting a SRS to retain access to a shared radio frequency spectrum band, a UE (e.g., UE3 in FIG. 6, 7, 8, 9, or 10) may transmit a channel reservation signal, such as a band occupation channel usage beacon signal (CUBS). In some examples, a network access device may allocate an interlace of frequency resources (e.g., one of a plurality of interlaces of frequency resources) that all UEs scheduled to transmit in an uplink data portion of a transmission structure may use to transmit a band occupation CUBS. At times, the interlace of frequency resources may be simultaneously used by more than one UE. In some examples, a UE may transmit a band occupation CUBS with an energy that matches the total energy that will be used by the UE to transmit a scheduled uplink transmission (e.g., a PUSCH) during an uplink data portion of a transmission structure. When a UE transmits a PUCCH in the same channel as the band occupation CUBS, the band occupation CUBS may be transmitted with an energy equal to the remaining available energy after transmitting the PUCCH, so that PUCCH power control does not need to be modified.

Figure 11:
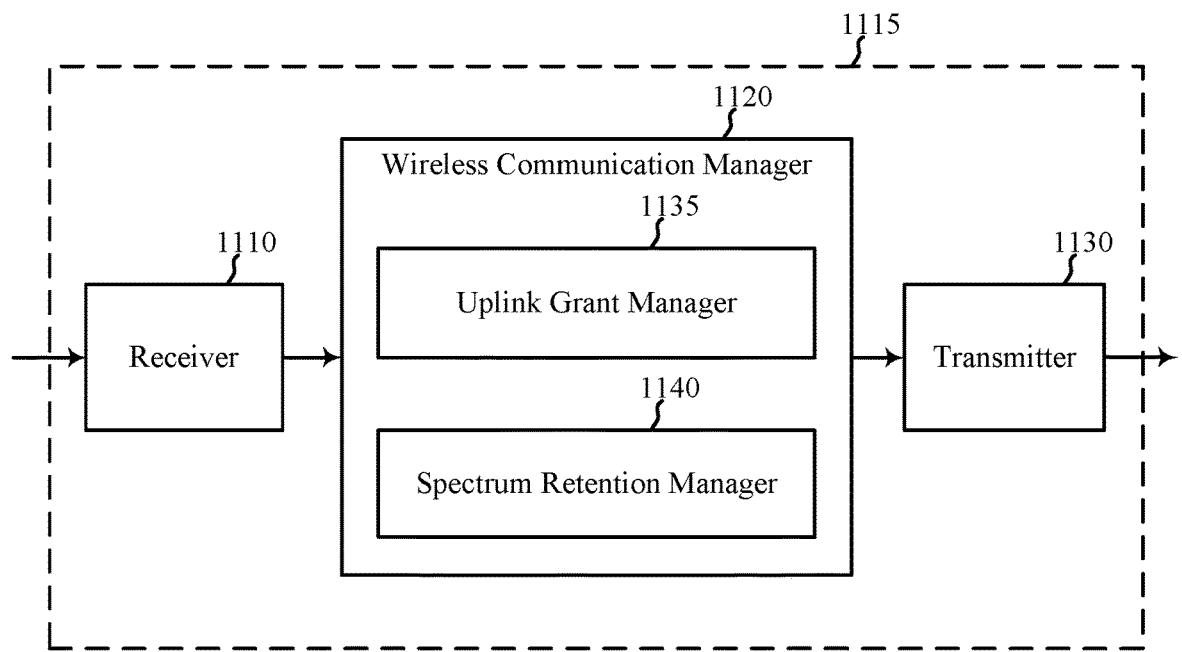
FIG. 11 shows a block diagram of a device that is capable of retaining access to a shared radio frequency spectrum band during an uplink control portion of a transmission structure, in accordance with various aspects of the present disclosure.

FIG. 11 shows a block diagram 1100 of a device 1115 that is capable of retaining access to a shared radio frequency spectrum band during an uplink control portion of a transmission structure, in accordance with various aspects of the present disclosure. The device 1115 may be an example of aspects of the UEs 115 described with reference to FIGS. 1 and 2. The device 1115 may include a receiver 1110, a wireless communication manager 1120, and a transmitter 1130. The device 1115 may also include a processor. Each of these components may be in communication with one another directly or indirectly (e.g., via one or more buses).

The receiver 1110 may receive information such as packets, user data, or control information associated with various information channels (e.g., control channels, data channels, information related to decoupled transmissions of channel quality feedback and ACK/NACK feedback, etc.). Received information may be passed on to other components of the device 1115. The receiver 1110 may be an example of aspects of the transceiver 1435 described with reference to FIG. 14. The receiver 1110 may include or be associated with a single antenna, or may include or be associated with a set of antennas.

The wireless communication manager 1120 may be an example of aspects of the UE wireless communication manager 1415 described with reference to FIG. 14. The wireless communication manager 1120 may include an uplink grant manager 1135 and a spectrum retention manager 1140. Each of these components may be in communication with one another directly or indirectly (e.g., via one or more buses).

The uplink grant manager 1135 may be used to receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH.

The spectrum retention manager 1140 may be used to retain access to the shared radio frequency spectrum band by transmitting an unscheduled transmission during the uplink control portion of the transmission structure. In some examples, the unscheduled transmission may include an unscheduled control transmission (e.g., a PUCCH and/or UCI). In some examples, the unscheduled control transmission may include at least one of an acknowledgement of the uplink grant, a CQI, a BSR, or a measurement. In some examples, the unscheduled transmission may be transmitted as a single bit acknowledgement of the uplink grant received at block 1605. In some examples, the unscheduled transmission may include an unscheduled data transmission, such as a portion of a PUSCH payload. In some examples, the unscheduled transmission may include a portion of a PUSCH payload transmitted on PUCCH resources or non-PUCCH resources allocated for the uplink control portion. In some examples, the unscheduled transmission may include a channel reservation signal (e.g., a channel reservation signal transmitted on an interlace of frequency resources allocated to bandwidth occupation transmissions).

In some examples of the device 1115, the unscheduled transmission may be transmitted on a set of resources determined by at least one of pre-configuration information, a downlink grant, the uplink grant, resources allocated for an uplink transmission during the uplink data portion, or a combination thereof.

The transmitter 1130 may transmit signals generated by other components of the device 1115 (e.g., channel quality feedback or ACK/NACK feedback). In some examples, the transmitter 1130 may be collocated with the receiver 1110 in a transceiver. For example, the transmitter 1130 may be an example of aspects of the transceiver 1435 described with reference to FIG. 14. The transmitter 1130 may include or be associated with a single antenna, or may include or be associated with a set of antennas, and in some examples may share one or more antennas with the receiver 1110.

Figure 12:
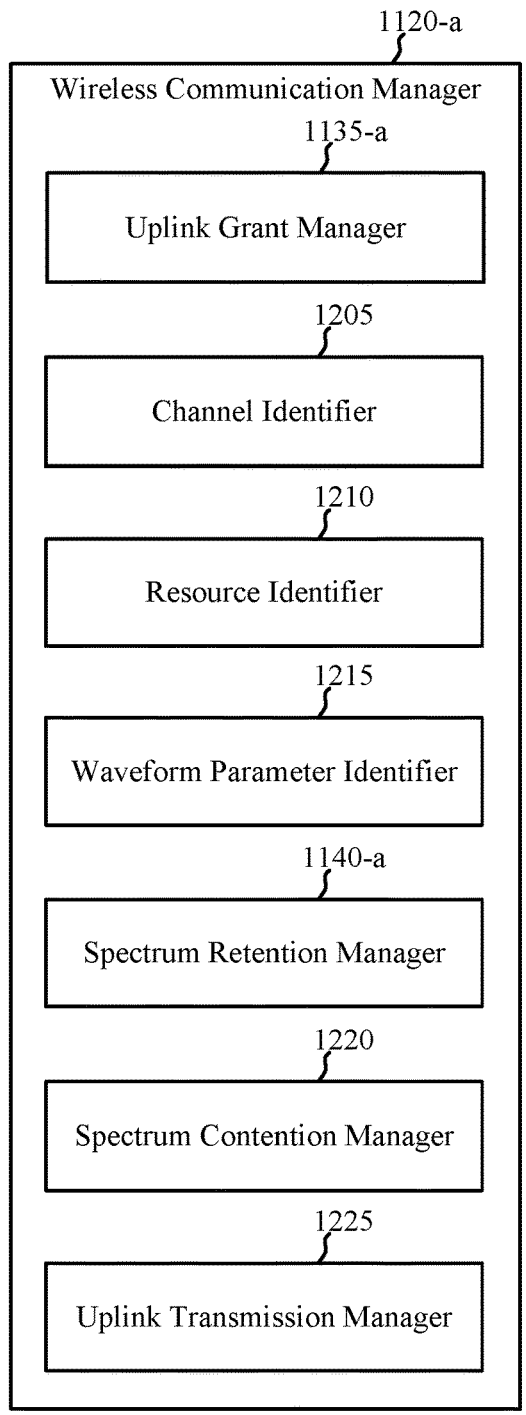
FIG. 12 shows a block diagram of a wireless communication manager that is capable of retaining access to a shared radio frequency spectrum band during an uplink control portion of a transmission structure, in accordance with various aspects of the present disclosure.

FIG. 12 shows a block diagram 1200 of a wireless communication manager 1120-$a$ that is capable of retaining access to a shared radio frequency spectrum band during an uplink control portion of a transmission structure, in accordance with various aspects of the present disclosure. The wireless communication manager 1120 may be an example of aspects of the wireless communication manager 1120 described with reference to FIG. 11 or the UE wireless communication manager 1415 described with reference to FIG. 14. The wireless communication manager 1120-$a$ may include an uplink grant manager 1135-$a$, a channel identifier 1205, a resource identifier 1210, a waveform parameter identifier 1215, a spectrum retention manager 1140-$a$, a spectrum contention manager 1220, and an uplink transmission manager 1225. Each of these components may be in communication with one another directly or indirectly (e.g., via one or more buses).

The uplink grant manager 1135-$a$ may be used to receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH.

The uplink grant manager 1135-*a* may also be used to determine when no transmission is scheduled for the uplink control portion of the transmission structure. The uplink grant manager 1135-*a* may also be used to receive a reactivation of the uplink grant when contention for access to the shared radio frequency spectrum band, prior to the uplink data portion, is not successful. In some examples, the reactivation of the uplink grant may consist of one bit.

The channel identifier 1205 may be used to identify a set of one or more channels allocated for transmitting an uplink transmission during the uplink data portion (e.g., an uplink transmission in accordance with an uplink grant received by the uplink grant manager 1135-*a*). In some examples, the set of one or more channels may include one channel. In other examples, the set of one or more channels may include a plurality of channels. In some examples, the uplink transmission may include a PUSCH.

The resource identifier 1210 may be used to identify a set of PUCCH resources allocated for the uplink control portion.

The waveform parameter identifier 1215 may be used to identify a set of waveform parameters for transmitting a PUSCH during the uplink data portion (e.g., in accordance with an uplink grant received by the uplink grant manager 1135-*a*). In some examples, the waveform parameter may identify a first set of one or more waveform parameters for transmitting the PUCCH during the uplink control portion and a second set of one or more waveform parameters for transmitting a PUSCH during the uplink data portion. In some examples, the first set of one or more waveform parameters may include an encoding scheme. In some examples, the second set of one or more waveform parameters may include at least one of an encoding scheme, a modulation an MCS, a beamforming parameter, a diversity parameter, or a precoding parameter.

The spectrum retention manager 1140-*a* may be used to retain access to the shared radio frequency spectrum band by transmitting an unscheduled transmission during the uplink control portion of the transmission structure, when the uplink grant manager 1135-*a* determines that no transmission is scheduled for the uplink control portion of the transmission structure. In some examples, the unscheduled transmission may include an unscheduled control transmission (e.g., a PUCCH and/or UCI). In some examples, the unscheduled control transmission may be transmitted on a set of one or more channels identified by the channel identifier 1205. In some examples, the unscheduled control transmission may include at least one of an acknowledgement of the uplink grant, an acknowledgement of a downlink grant for the downlink portion, a CQI, a BSR, or a measurement. In some examples, the unscheduled transmission may be transmitted as a single bit acknowledgement of an uplink grant received by the uplink grant manager 1135-*a*. In some examples, the spectrum retention manager 1140-*a* may transmit a PUCCH payload during the uplink control portion of the transmission structure, using a set of wave parameters identified by the waveform parameter identifier 1215. In some examples, the unscheduled transmission may include an unscheduled data transmission, such as a portion of a PUSCH payload. In some examples, the unscheduled transmission may include a portion of a PUSCH payload transmitted on PUCCH resources allocated for the uplink control portion. In some examples, the portion of the PUSCH payload may be transmitted using a modified PUSCH waveform based at least in part on the first and second sets of one or more waveform parameters identified by the waveform parameter identifier 1215. In some examples, the unscheduled transmission may include a channel reservation signal (e.g., a channel reservation signal transmitted on an interlace of frequency resources allocated to bandwidth occupation transmissions). In some examples, the unscheduled transmission may include a SRS.

In some examples of the wireless communication manager 1120-*a*, the unscheduled transmission may be transmitted on a set of resources determined by at least one of pre-configuration information, a downlink grant, the uplink grant, resources allocated for an uplink transmission during the uplink data portion, or a combination thereof.

The spectrum contention manager 1220 may be used to contend for access to the shared radio frequency spectrum band prior to transmitting during the uplink data portion. In some examples, contending for access to the shared radio frequency spectrum band may include performing a single-slot CCA procedure.

The uplink transmission manager 1225 may be used to transmit an uplink transmission during the uplink data portion, in accordance with an uplink grant received by the uplink grant manager 1135-*a*, when contention for access to the shared radio frequency spectrum band is successful. The uplink transmission manager 1225 may refrain from transmitting an uplink transmission during the uplink data portion when contention for access to the shared radio frequency spectrum band is not successful.

Figure 13:
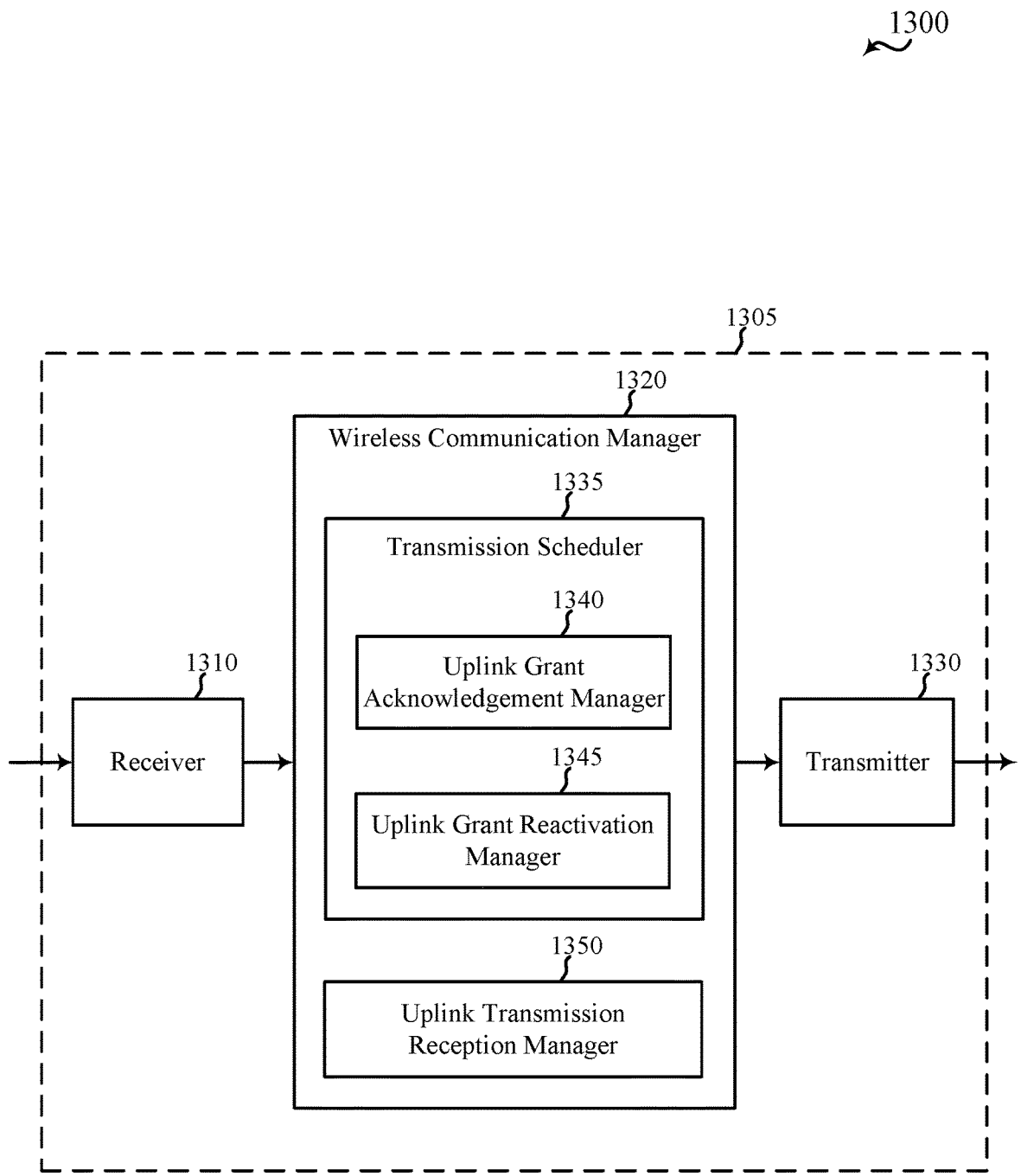
FIG. 13 shows a block diagram of a device that is capable of receiving unscheduled transmissions transmitted by UEs to retain access to a shared radio frequency spectrum band, in accordance with various aspects of the present disclosure.

FIG. 13 shows a block diagram 1300 of a device 1305 that is capable of receiving unscheduled transmissions transmitted by UEs to retain access to a shared radio frequency spectrum band, in accordance with various aspects of the present disclosure. The device 1305 may be an example of aspects of the base stations 105 described with reference to FIGS. 1 and 2, or an example of aspects of other network access devices. The device 1305 may include a receiver 1310, a wireless communication manager 1320, and a transmitter 1330. The device 1305 may also include a processor. Each of these components may be in communication with one another directly or indirectly (e.g., via one or more buses).

The receiver 1310 may receive information such as packets, user data, or control information associated with various information channels (e.g., control channels, data channels, information related to decoupled transmissions of channel quality feedback and ACK/NACK feedback, etc.). Received information may be passed on to other components of the device 1305. The receiver 1310 may be an example of aspects of the transceiver 1535 described with reference to FIG. 15. The receiver 1310 may include or be associated with a single antenna, or may include or be associated with a set of antennas.

The wireless communication manager 1320 may be an example of aspects of the base station wireless communication manager 1515 described with reference to FIG. 15. The wireless communication manager 1320 may include a transmission scheduler 1335 and an uplink transmission reception manager 1350. The transmission scheduler 1335 may include an uplink grant acknowledgement manager 1340 and an uplink grant reactivation manager 1345. Each of these components may be in communication with one another directly or indirectly (e.g., via one or more buses).

The transmission scheduler 1335 may be used to transmit, in a downlink portion of a transmission structure on a shared radio frequency spectrum band, an uplink grant for an uplink data portion of the transmission structure. The transmission structure may include a time domain multiplexed downlink portion, followed by an uplink control portion, followed by the uplink data portion. The uplink grant acknowledgement manager 1340 may be used to receive an acknowledgement of the uplink grant during the uplink control portion of the transmission structure. The uplink transmission reception manager 1350 may be used to determine that no transmission is received according to the uplink grant. The uplink grant reactivation manager 1345 may be used to transmit, subsequent to the uplink data portion, a reactivation of the uplink grant. In some examples, the reactivation of the uplink grant may consist of one bit.

The transmitter 1130 may transmit signals generated by other components of the device 1115 (e.g., channel quality feedback or ACK/NACK feedback). In some examples, the transmitter 1130 may be collocated with the receiver 1110 in a transceiver. For example, the transmitter 1130 may be an example of aspects of the transceiver 1435 described with reference to FIG. 14. The transmitter 1130 may include or be associated with a single antenna, or may include or be associated with a set of antennas, and in some examples may share one or more antennas with the receiver 1110.

Figure 14:
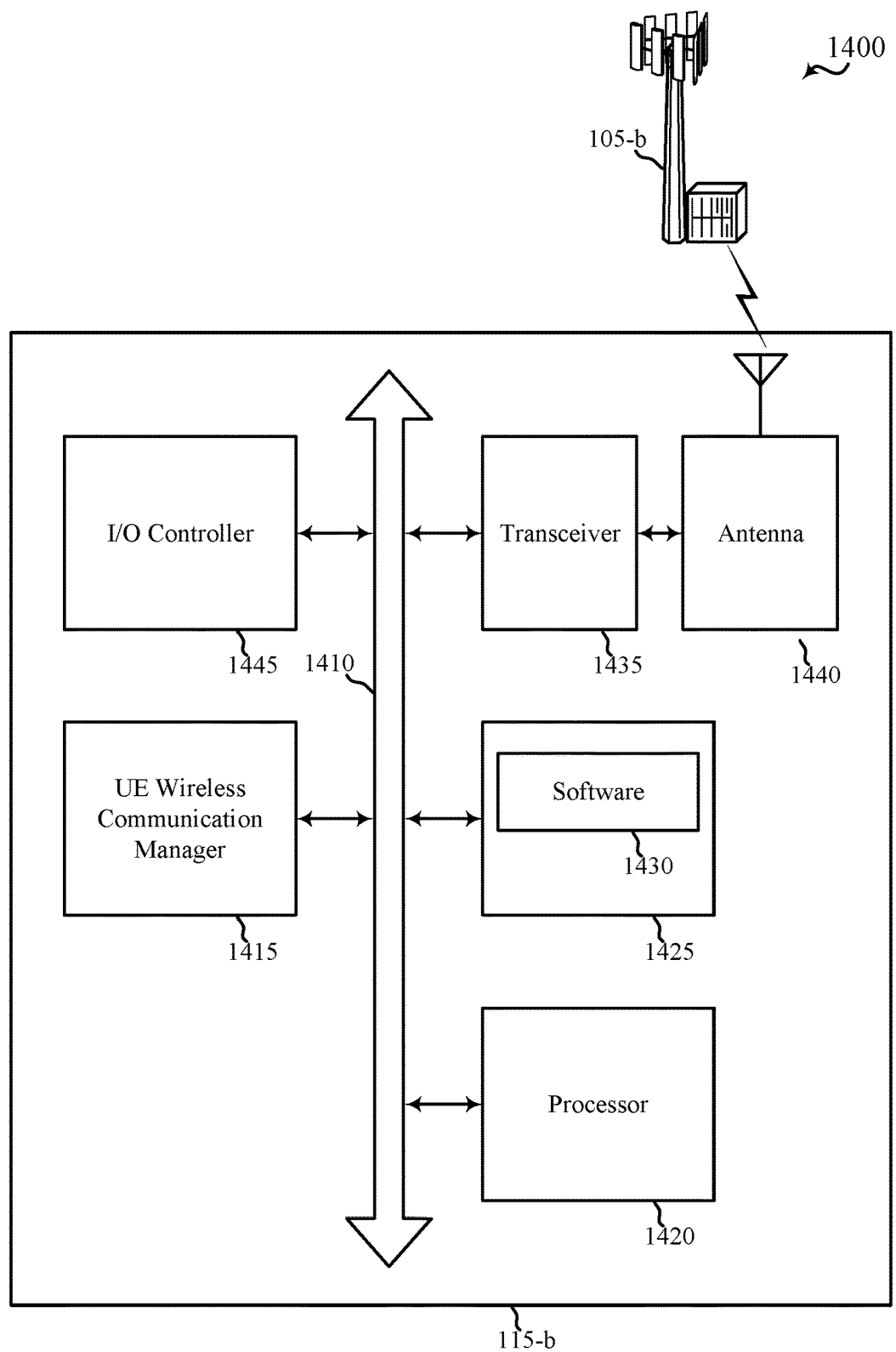
FIG. 14 shows a diagram of a system including a UE that is capable of retaining access to a shared radio frequency spectrum band during an uplink control portion of a transmission structure, in accordance with various aspects of the present disclosure.

FIG. 14 shows a diagram of a system 1400 including a UE 115-b that is capable of retaining access to a shared radio frequency spectrum band during an uplink control portion of a transmission structure, in accordance with various aspects of the present disclosure. The UE 115-b may be an example of aspects of the UEs 115 or device 1115 described with reference to FIGS. 1, 2, and 11. The UE 115-b may include components for bi-directional voice and data communication, including components for transmitting and receiving communications. The components may include a UE wireless communication manager 1415 (which may be an example of aspects of the wireless communication manager described with reference to FIGS. 11 and 12), a processor 1420, a memory 1425, software 1430, a transceiver 1435, an antenna 1440, and an I/O controller 1445. These components may be in electronic communication via one or more busses (e.g., bus 1410). The UE 115-b may communicate wirelessly with one or more network access devices (e.g., base station 105-b).

The processor 1420 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1420 may be configured to operate a memory array using a memory controller. In other cases, a memory controller may be integrated into the processor 1420. The processor 1420 may be configured to execute computer-readable instructions stored in a memory to perform various functions (e.g., functions or tasks supporting retention of access to a shared radio frequency spectrum band during an uplink control portion of a transmission structure).

The memory 1425 may include random access memory (RAM) or read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware and/or software operation such as the interaction with peripheral components or devices.

The software 1430 may include code to implement aspects of the present disclosure, including code to support retention of access to a shared radio frequency spectrum band during an uplink control portion of a transmission structure. The software 1430 may be stored in a non-transitory computer-readable medium such as a system memory or other memory. In some cases, the software 1430 may not be directly executable by the processor but may cause a processor (e.g., when compiled and executed) to perform functions described herein.

The transceiver 1435 may communicate bi-directionally, via one or more antennas and/or wired links. In some examples, the transceiver 1435 may include a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the UE 115-b may include a single antenna 1440. However, in some cases the UE 115-b may have more than one antenna 1440, which may be capable of concurrently transmitting or receiving multiple wireless transmissions.

The I/O controller 1445 may manage input and output signals for the UE 115-b. The I/O controller 1445 may also manage peripherals not integrated into the UE 115-b. In some cases, the I/O controller 1445 may represent a physical connection or port to an external peripheral. In some cases, the I/O controller 1445 may utilize an operating system such as iOS®, ANDROID®, MS-DOS®, MS-WINDOWS®, OS/2®, UNIX®, LINUX®, or another known operating system.

Figure 15:
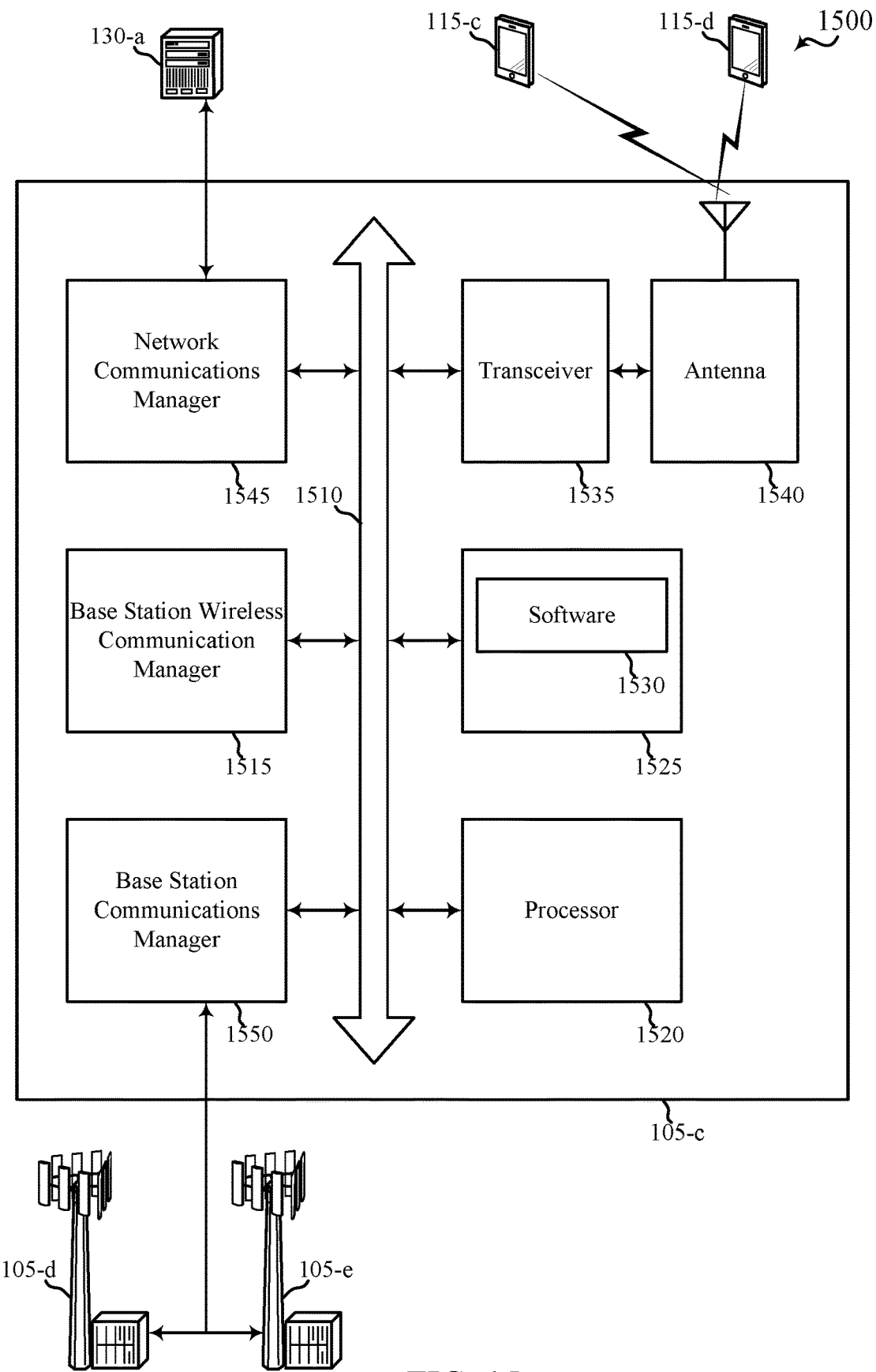
FIG. 15 shows a diagram of a system including a base station (or other network access device) that is capable of receiving unscheduled transmissions transmitted by UEs to retain access to a shared radio frequency spectrum band during an uplink control portion of a transmission structure, in accordance with various aspects of the present disclosure.

FIG. 15 shows a diagram of a system 1500 including a base station 105-c (or other network access device) that is capable of receiving unscheduled transmissions transmitted by UEs to retain access to a shared radio frequency spectrum band during an uplink control portion of a transmission structure, in accordance with various aspects of the present disclosure. The base station 105-c may be an example of aspects of the base stations 105 or device 1305 described with reference to FIGS. 1, 2, and 13. The base station 105-c may include components for bi-directional voice and data communication, including components for transmitting and receiving communications. The components may include a base station wireless communication manager 1515 (which may be an example of aspects of the wireless communication manager described with reference to FIG. 13), a processor 1520, a memory 1525, software 1530, a transceiver 1535, an antenna 1540, a network communications manager 1545, and a base station communications manager 1550. These components may be in electronic communication via one or more busses (e.g., bus 1510). The base station 105-c may communicate wirelessly with one or more UEs 115 or other network access devices (e.g., base station 105-d or base station 105-e).

The processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1520 may be configured to operate a memory array using a memory controller. In other cases, a memory controller may be integrated into the processor 1520. The processor 1520 may be configured to execute computer-readable instructions stored in a memory to perform various functions (e.g., functions or tasks supporting retention of access to a shared radio frequency spectrum band, by a UE, during an uplink control portion of a transmission structure).

The memory 1525 may include RAM or ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

The software 1530 may include code to implement aspects of the present disclosure, including code to support retention of access to a shared radio frequency spectrum band, by a UE, during an uplink control portion of a transmission structure. The software 1530 may be stored in a non-transitory computer-readable medium such as a system memory or other memory. In some cases, the software 1530 may not be directly executable by the processor but may cause a processor (e.g., when compiled and executed) to perform functions described herein.

The transceiver 1535 may communicate bi-directionally, via one or more antennas and/or wired links. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the base station 105-c may include a single antenna 1540. However, in some cases the base station 105-c may have more than one antenna 1540, which may be capable of concurrently transmitting or receiving multiple wireless transmissions.

The network communications manager 1545 may manage communications with a core network 130-a (e.g., via one or more wired backhaul links). For example, the network communications manager 1545 may manage the transfer of data communications for client devices, such as one or more UEs 115.

The base station communications manager 1550 may manage communications with other base station 105 (or other network access devices), and may include a controller or scheduler for controlling communications with UEs 115 in cooperation with other base stations 105. In some examples, the base station communications manager 1550 may provide an X2 interface within an LTE/LTE-A wireless communication network that provides communication between base stations 105.

Figure 16:
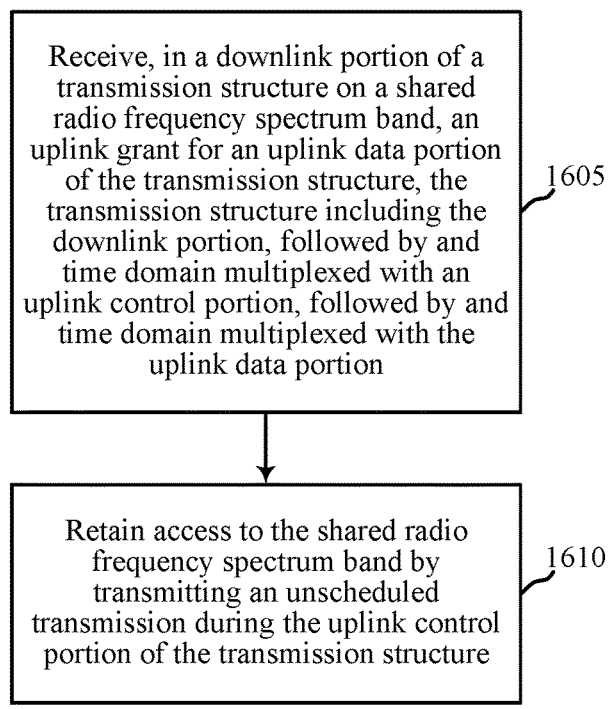
FIG. 16 shows a flowchart illustrating a method for wireless communication, in accordance with various aspects of the present disclosure.

FIG. 16 shows a flowchart illustrating a method 1600 for wireless communication, in accordance with various aspects of the present disclosure. The operations of method 1600 may be implemented by a UE 115 or its components as described herein. In some examples, the operations of method 1600 may be performed by a wireless communication manager, as described with reference to FIGS. 11 and 12. In some examples, a UE 115 may execute a set of codes to control the functional elements of the UE 115 to perform the functions described below. Additionally or alternatively, the UE 115 may perform aspects the functions described below using special-purpose hardware.

At block 1605, the UE 115 may receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH. In some examples, the operations of block 1605 may be performed as described with reference to FIGS. 6-10. In some examples, aspects of the operations of block 1605 may be performed by the uplink grant manager 1135 described with reference to FIGS. 11 and 12.

At block 1610, the UE 115 may retain access to the shared radio frequency spectrum band by transmitting an unscheduled transmission during the uplink control portion of the transmission structure. In some examples, the unscheduled transmission may include an unscheduled control transmission (e.g., a PUCCH and/or UCI). In some examples, the unscheduled control transmission may include at least one of an acknowledgement of the uplink grant, an acknowledgement of a downlink grant for the downlink portion, a CQI, a BSR, or a measurement. In some examples, the unscheduled transmission may be transmitted as a single bit acknowledgement of the uplink grant received at block 1605. In some examples, the unscheduled transmission may include an unscheduled data transmission, such as a portion of a PUSCH payload. In some examples, the unscheduled transmission may include a portion of a PUSCH payload transmitted on PUCCH resources or non-PUCCH resources allocated for the uplink control portion. In some examples, the unscheduled transmission may include a channel reservation signal (e.g., a channel reservation signal transmitted on an interlace of frequency resources allocated to bandwidth occupation transmissions). In some examples, the unscheduled transmission may include a SRS. In some examples, the operations of block 1610 may be performed as described with reference to FIGS. 6-10. In some examples, aspects of the operations of block 1610 may be performed by the spectrum retention manager 1140 described with reference to FIGS. 11 and 12.

In some examples of the method 1600, the unscheduled transmission may be transmitted, at block 1610, on a set of resources determined by at least one of pre-configuration information, a downlink grant, the uplink grant, resources allocated for an uplink transmission during the uplink data portion, or a combination thereof.

Figure 17:
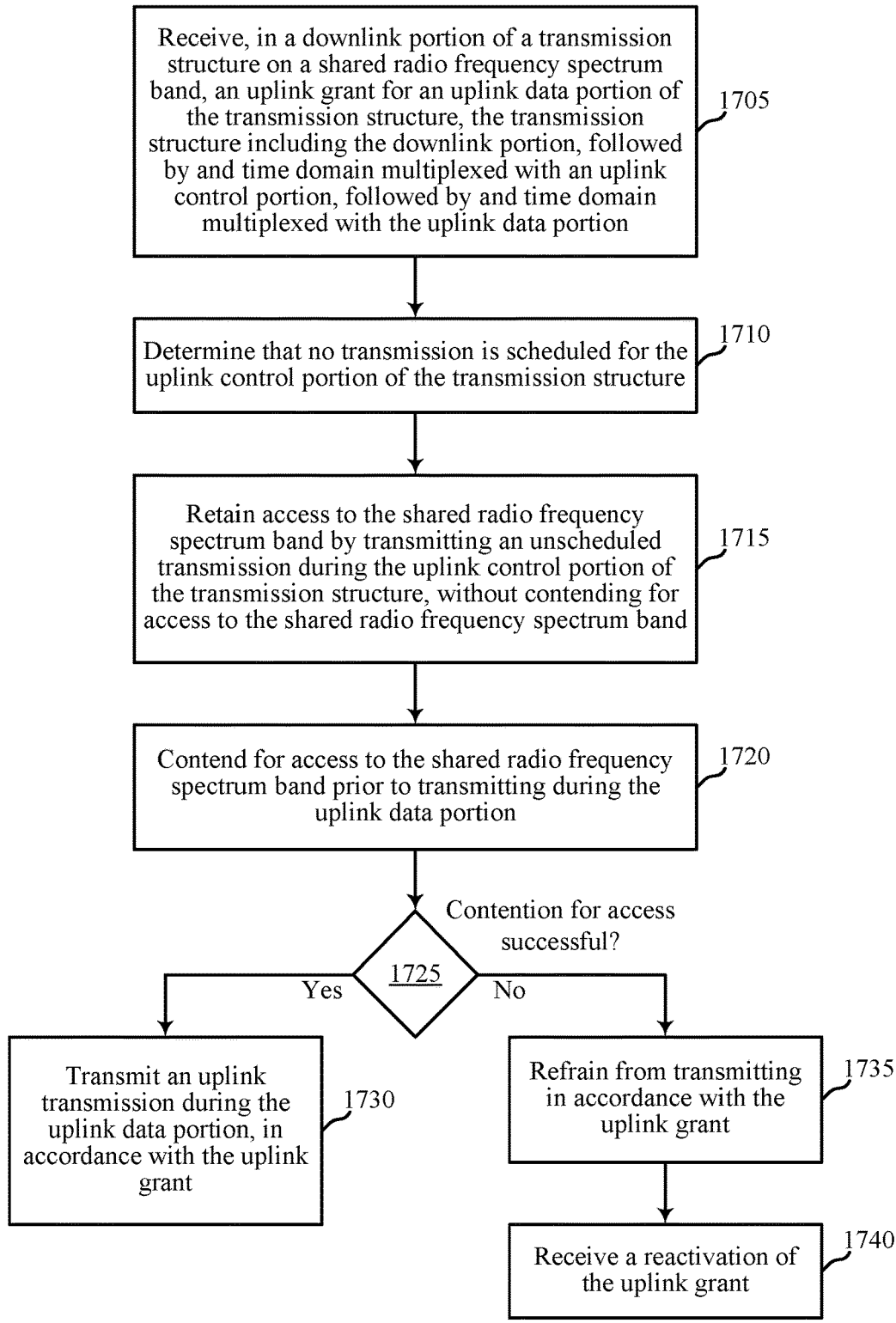
FIG. 17 shows a flowchart illustrating a method for wireless communication, in accordance with various aspects of the present disclosure.

FIG. 17 shows a flowchart illustrating a method 1700 for wireless communication, in accordance with various aspects of the present disclosure. The operations of method 1700 may be implemented by a UE 115 or its components as described herein. In some examples, the operations of method 1700 may be performed by a wireless communication manager, as described with reference to FIGS. 11 and 12. In some examples, a UE 115 may execute a set of codes to control the functional elements of the UE 115 to perform the functions described below. Additionally or alternatively, the UE 115 may perform aspects the functions described below using special-purpose hardware.

At block 1705, the UE 115 may receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH. In some examples, the operations of block 1705 may be performed as described with reference to FIGS. 6-10. In some examples, aspects of the operations of block 1705 may be performed by the uplink grant manager 1135 described with reference to FIGS. 11 and 12.

At block 1710, the UE 115 may determine that no transmission is scheduled for the uplink control portion of the transmission structure. In some examples, the operations of block 1710 may be performed as described with reference to FIGS. 6-10. In some examples, aspects of the operations of block 1710 may be performed by the uplink grant manager 1135 described with reference to FIGS. 11 and 12.

At block 1715, the UE 115 may retain access to the shared radio frequency spectrum band by transmitting an unscheduled transmission during the uplink control portion of the transmission structure. The UE 115 may transmit the unscheduled transmission without contending for access to the shared radio frequency spectrum band. In some examples, the operations of block 1715 may be performed as described with reference to FIGS. 6-10. In some examples, aspects of the operations of block 1715 may be performed by the spectrum retention manager 1140 described with reference to FIGS. 11 and 12.

In some examples of the method 1700, the unscheduled transmission transmitted at block 1715 may include an unscheduled control transmission (e.g., a PUCCH and/or UCI). In some examples, the unscheduled control transmission may include at least one of an acknowledgement of the uplink grant, an acknowledgement of a downlink grant for the downlink portion, a CQI, a BSR, or a measurement. In some examples, the unscheduled transmission may be transmitted as a single bit acknowledgement of the uplink grant received at block 1705. In some examples, the unscheduled transmission may include an unscheduled data transmission, such as a portion of a PUSCH payload. In some examples, the unscheduled transmission may include a portion of a PUSCH payload transmitted on PUCCH resources or non-PUCCH resources allocated for the uplink control portion. In some examples, the unscheduled transmission may include a channel reservation signal (e.g., a channel reservation signal transmitted on an interlace of frequency resources allocated to bandwidth occupation transmissions). In some examples, the unscheduled transmission may include a SRS.

In some examples of the method 1700, the unscheduled transmission may be transmitted, at block 1715, on a set of resources determined by at least one of pre-configuration information, a downlink grant, the uplink grant, resources allocated for an uplink transmission during the uplink data portion, or a combination thereof.

At block 1720, the UE 115 may contend for access to the shared radio frequency spectrum band prior to transmitting during the uplink data portion. In some examples, contending for access to the shared radio frequency spectrum band may include performing a single-slot CCA procedure. In some examples, the operations of block 1720 may be performed as described with reference to FIGS. 6-10. In some examples, aspects of the operations of block 1720 may be performed by the spectrum contention manager 1220 described with reference to FIG. 12.

At block 1725, the UE 115 may determine whether contention for access to the shared radio frequency spectrum band, at block 1720, was successful. Upon determining contention for access to the shared radio frequency spectrum band was successful, the UE 115 may continue the method 1700 at block 1730. Upon determining contention for access to the shared radio frequency spectrum band was not successful, the UE 115 may continue the method 1700 at block 1735. In some examples, the operations of block 1725 may be performed as described with reference to FIGS. 6-10. In some examples, aspects of the operations of block 1725 may be performed by the spectrum contention manager 1220 described with reference to FIG. 12.

At block 1730, the UE 115 may transmit an uplink transmission during the uplink data portion, in accordance with the uplink grant received at block 1705. In some examples, the operations of block 1730 may be performed as described with reference to FIGS. 6-10. In some examples, aspects of the operations of block 1730 may be performed by the uplink transmission manager 1225 described with reference to FIG. 12.

At block 1735, the UE 115 may refrain from transmitting in accordance with the uplink grant. In some examples, the operations of block 1735 may be performed as described with reference to FIGS. 6-10. In some examples, aspects of the operations of block 1735 may be performed by the uplink transmission manager 1225 described with reference to FIG. 12.

At block 1740, subsequent to the uplink data portion, the UE 115 may receive a reactivation of the uplink grant. In some examples, the reactivation of the uplink grant may consist of one bit. In some examples, the operations of block 1740 may be performed as described with reference to FIGS. 6-10. In some examples, aspects of the operations of block 1740 may be performed by the uplink grant manager 1135 described with reference to FIGS. 11 and 12.

Figure 18:
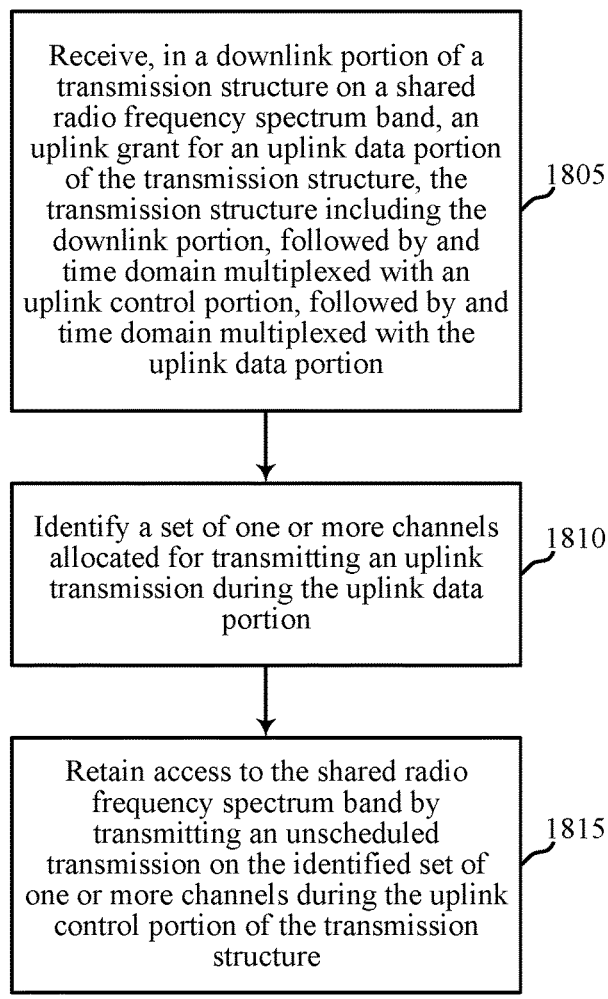
FIG. 18 shows a flowchart illustrating a method for wireless communication, in accordance with various aspects of the present disclosure.

FIG. 18 shows a flowchart illustrating a method 1800 for wireless communication, in accordance with various aspects of the present disclosure. The operations of method 1800 may be implemented by a UE 115 or its components as described herein. In some examples, the operations of method 1800 may be performed by a wireless communication manager, as described with reference to FIGS. 11 and 12. In some examples, a UE 115 may execute a set of codes to control the functional elements of the UE 115 to perform the functions described below. Additionally or alternatively, the UE 115 may perform aspects the functions described below using special-purpose hardware.

At block 1805, the UE 115 may receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH. In some examples, the operations of block 1805 may be performed as described with reference to FIGS. 6-10. In some examples, aspects of the operations of block 1805 may be performed by the uplink grant manager 1135 described with reference to FIGS. 11 and 12.

At block 1810, the UE 115 may identify a set of one or more channels allocated for transmitting an uplink transmission during the uplink data portion (e.g., an uplink transmission in accordance with the uplink grant received at block 1805). In some examples, the set of one or more channels may include one channel. In other examples, the set of one or more channels may include a plurality of channels. In some examples, the uplink transmission may include a PUSCH. In some examples, the operations of block 1810 may be performed as described with reference to FIGS. 6-10. In some examples, aspects of the operations of block 1815 may be performed by the channel identifier 1205 described with reference to FIG. 12.

At block 1815, the UE 115 may retain access to the shared radio frequency spectrum band by transmitting an unscheduled transmission during the uplink control portion of the transmission structure. The unscheduled transmission may be transmitted on the set of one or more channels identified at block 1810. In some examples, the unscheduled transmission may include an unscheduled control transmission (e.g., a PUCCH and/or UCI). In some examples, the unscheduled control transmission may include at least one of an acknowledgement of the uplink grant, an acknowledgement of a downlink grant for the downlink portion, a CQI, a BSR, or a measurement. In some examples, the unscheduled transmission may be transmitted as a single bit acknowledgement of the uplink grant received at block 1805. In some examples, the unscheduled transmission may include an unscheduled data transmission, such as a portion of a PUSCH payload. In some examples, the unscheduled transmission may include a portion of a PUSCH payload transmitted on PUCCH resources or non-PUCCH resources allocated for the uplink control portion. In some examples, the unscheduled transmission may include a channel reservation signal (e.g., a channel reservation signal transmitted on an interlace of frequency resources allocated to bandwidth occupation transmissions). In some examples, the unscheduled transmission may include a SRS. In some examples, the operations of block 1815 may be performed as described with reference to FIGS. 6-10. In some examples, aspects of the operations of block 1815 may be performed by the spectrum retention manager 1140 described with reference to FIGS. 11 and 12.

In some examples of the method 1800, the unscheduled transmission may be transmitted, at block 1815, on a set of resources determined by at least one of pre-configuration information, a downlink grant, the uplink grant, resources allocated for an uplink transmission during the uplink data portion, or a combination thereof.

Figure 19:
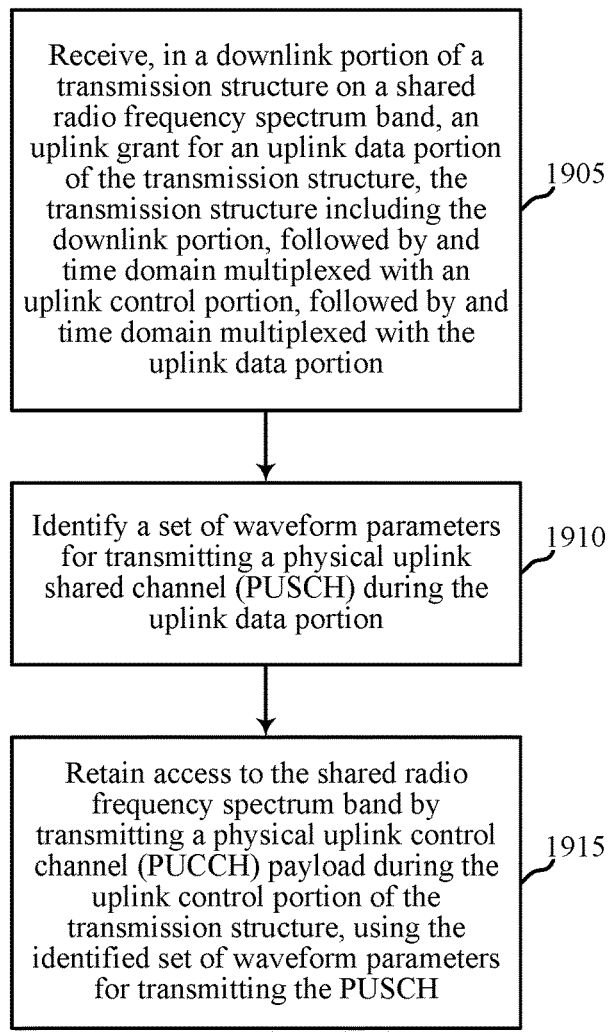
FIG. 19 shows a flowchart illustrating a method for wireless communication, in accordance with various aspects of the present disclosure.

FIG. 19 shows a flowchart illustrating a method 1900 for wireless communication, in accordance with various aspects of the present disclosure. The operations of method 1900 may be implemented by a UE 115 or its components as described herein. In some examples, the operations of method 1900 may be performed by a wireless communication manager, as described with reference to FIGS. 11 and 12. In some examples, a UE 115 may execute a set of codes to control the functional elements of the UE 115 to perform the functions described below. Additionally or alternatively, the UE 115 may perform aspects the functions described below using special-purpose hardware.

At block 1905, the UE 115 may receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH. In some examples, the operations of block 1905 may be performed as described with reference to FIG. 7. In some examples, aspects of the operations of block 1905 may be performed by the uplink grant manager 1135 described with reference to FIGS. 11 and 12.

At block 1910, the UE 115 may identify a set of waveform parameters for transmitting a PUSCH during the uplink data portion (e.g., in accordance with the uplink grant received at block 1905). In some examples, the operations of block 1910 may be performed as described with reference to FIG. 7. In some examples, aspects of the operations of block 1910 may be performed by the waveform parameter identifier 1215 described with reference to FIG. 12.

At block 1915, the UE 115 may retain access to the shared radio frequency spectrum band by transmitting a PUCCH payload during the uplink control portion of the transmission structure. The PUCCH payload may be transmitted using the set of wave parameters identified at block 1910. In some examples, the PUCCH payload may include at least one of an acknowledgement of the uplink grant, an acknowledgement of a downlink grant for the downlink portion, a CQI, a BSR, or a measurement. In some examples, the unscheduled transmission may be transmitted as a single bit acknowledgement of the uplink grant received at block 1905. In some examples, the operations of block 1915 may be performed as described with reference to FIG. 7. In some examples, aspects of the operations of block 1915 may be performed by the spectrum retention manager 1140 described with reference to FIGS. 11 and 12.

In some examples of the method 1900, the unscheduled transmission may be transmitted, at block 1915, on a set of resources determined by at least one of pre-configuration information, a downlink grant, the uplink grant, resources allocated for an uplink transmission during the uplink data portion, or a combination thereof.

Figure 20:
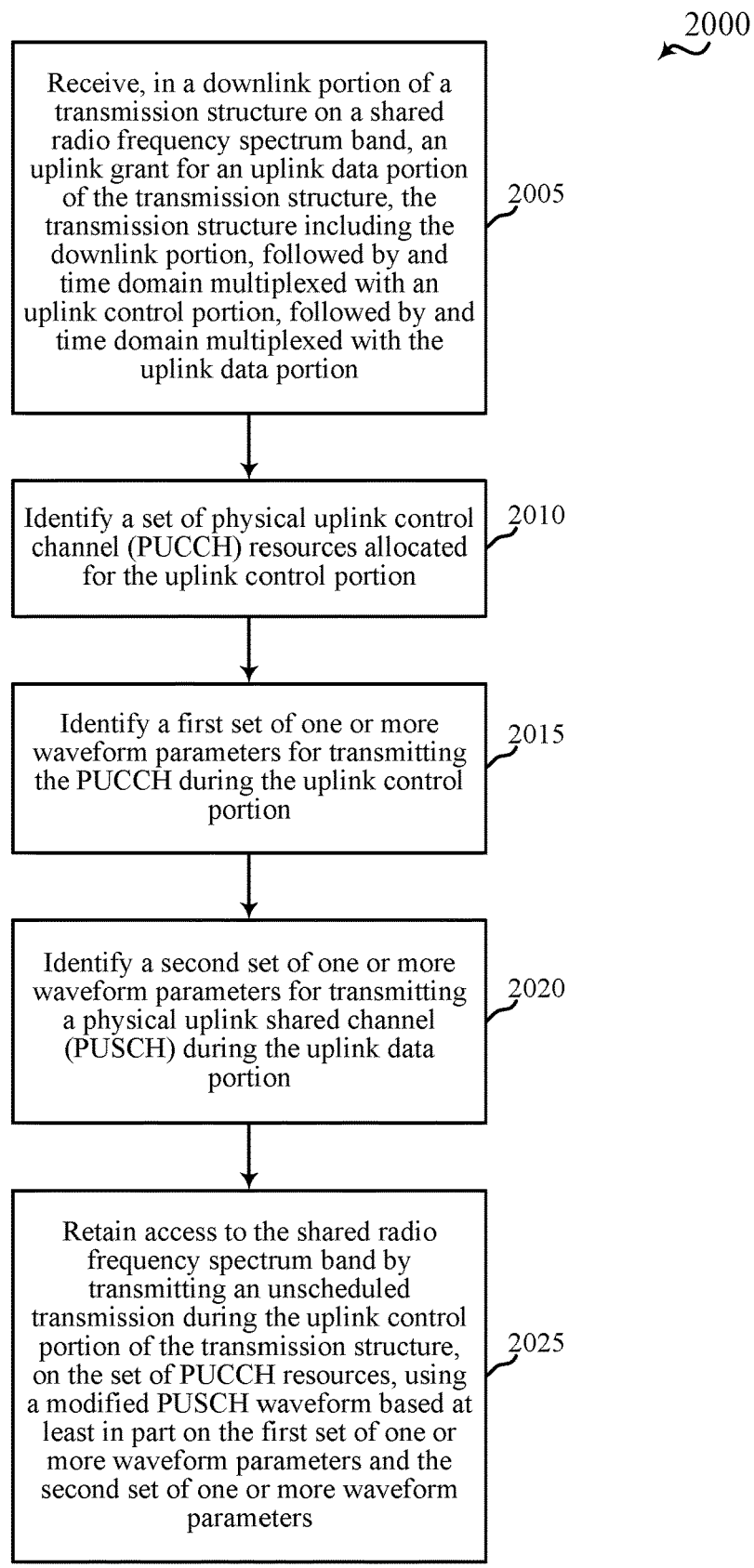
FIG. 20 shows a flowchart illustrating a method for wireless communication, in accordance with various aspects of the present disclosure.

FIG. 20 shows a flowchart illustrating a method 2000 for wireless communication, in accordance with various aspects of the present disclosure. The operations of method 2000 may be implemented by a UE 115 or its components as described herein. In some examples, the operations of method 2000 may be performed by a wireless communication manager, as described with reference to FIGS. 11 and 12. In some examples, a UE 115 may execute a set of codes to control the functional elements of the UE 115 to perform the functions described below. Additionally or alternatively, the UE 115 may perform aspects the functions described below using special-purpose hardware.

At block 2005, the UE 115 may receive, in a downlink portion of a transmission structure on a shared radio frequency spectrum band, an uplink grant for an uplink data portion of the transmission structure. The transmission structure may include the downlink portion, followed by and time domain multiplexed with an uplink control portion, followed by and time domain multiplexed with the uplink data portion. In some examples, the uplink grant may be received in a PDCCH. In some examples, the operations of block 2005 may be performed as described with reference to FIG. 9. In some examples, aspects of the operations of block 2005 may be performed by the uplink grant manager 1135 described with reference to FIGS. 11 and 12.

At block 2010, the UE 115 may identify a set of PUCCH resources allocated for the uplink control portion. In some examples, the operations of block 2010 may be performed as described with reference to FIG. 9. In some examples, aspects of the operations of block 2010 may be performed by the resource identifier 1210 described with reference to FIG. 12.

At block 2015, the UE 115 may identify a first set of one or more waveform parameters for transmitting the PUCCH during the uplink control portion. In some examples, the first set of one or more waveform parameters may include an encoding scheme. In some examples, the operations of block 2015 may be performed as described with reference to FIG. 9. In some examples, aspects of the operations of block 2015 may be performed by the waveform parameter identifier 1215 described with reference to FIG. 12.

At block 2020, the UE 115 may identify a second set of one or more waveform parameters for transmitting a PUSCH during the uplink data portion. In some examples, the second set of one or more waveform parameters may include at least one of an encoding scheme, a modulation an MCS, a beamforming parameter, a diversity parameter, or a precoding parameter. In some examples, the operations of block 2020 may be performed as described with reference to FIG. 9. In some examples, aspects of the operations of block 2020 may be performed by the waveform parameter identifier 1215 described with reference to FIG. 12.

At block 2025, the UE 115 may retain access to the shared radio frequency spectrum band by transmitting an unscheduled transmission during the uplink control portion of the transmission structure. In some examples, the unscheduled transmission may include a portion of a PUSCH payload transmitted on the PUCCH resources identified at block 2010, using a modified PUSCH waveform based at least in part on the first set of one or more waveform parameters (identified at block 2015) and the second set of one or more waveform parameters (identified at block 2020). In some examples, the operations of block 2025 may be performed as described with reference to FIG. 9. In some examples, aspects of the operations of block 2025 may be performed by the spectrum retention manager 1140 described with reference to FIGS. 11 and 12.

In some examples of the method 2000, the unscheduled transmission may be transmitted, at block 2025, on a set of resources determined by at least one of pre-configuration information, a downlink grant, the uplink grant, resources allocated for an uplink transmission during the uplink data portion, or a combination thereof.

Figure 21:
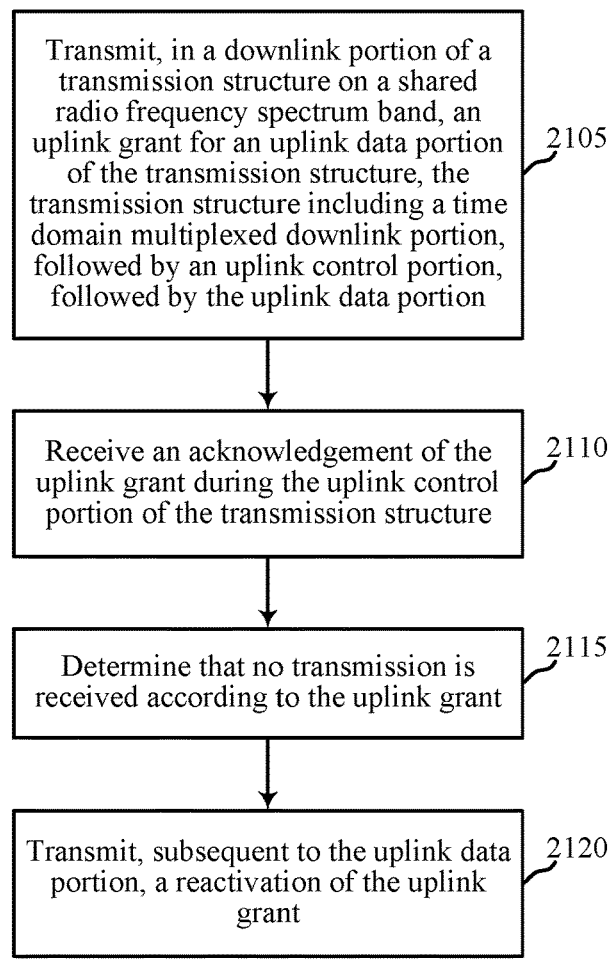
FIG. 21 shows a flowchart illustrating a method for wireless communication, in accordance with various aspects of the present disclosure.

FIG. 21 shows a flowchart illustrating a method 2100 for wireless communication, in accordance with various aspects of the present disclosure. The operations of method 2100 may be implemented by a network access device (e.g., a base station 105) or its components as described herein. In some examples, the operations of method 2100 may be performed by a wireless communication manager, as described with reference to FIG. 13. In some examples, a network access device may execute a set of codes to control the functional elements of the network access device to perform the functions described below. Additionally or alternatively, the network access device may perform aspects the functions described below using special-purpose hardware.

At block 2105, the network access device may transmit, in a downlink portion of a transmission structure on a shared radio frequency spectrum band, an uplink grant for an uplink data portion of the transmission structure. The transmission structure may include a time domain multiplexed downlink portion, followed by an uplink control portion, followed by the uplink data portion. In some examples, the operations of block 2105 may be performed as described with reference to FIGS. 6-7. In some examples, aspects of the operations of block 2105 may be performed by the transmission scheduler 1335 described with reference to FIG. 13.

At block 2110, the network access device may receive an acknowledgement of the uplink grant during the uplink control portion of the transmission structure. In some examples, the operations of block 2110 may be performed as described with reference to FIGS. 6-7. In some examples, aspects of the operations of block 2110 may be performed by the uplink grant acknowledgement manager 1340 described with reference to FIG. 13.

At block 2115, the network access device may determine that no transmission is received according to the uplink grant. In some examples, the operations of block 2115 may be performed as described with reference to FIGS. 6-7. In some examples, aspects of the operations of block 2115 may be performed by the uplink transmission reception manager 1350 described with reference to FIG. 13.

At block 2120, the network access device may transmit, subsequent to the uplink data portion, a reactivation of the uplink grant. In some examples, the reactivation of the uplink grant may consist of one bit. In some examples, the operations of block 2120 may be performed as described with reference to FIGS. 6-7. In some examples, aspects of the operations of block 2120 may be performed by the uplink grant reactivation manager 1345 described with reference to FIG. 13.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, in a downlink portion of a transmission structure on a shared radio frequency spectrum band, an uplink grant for an uplink data portion of the transmission structure, the transmission structure comprising the downlink portion, followed by and time domain multiplexed with an uplink control portion, followed by and time domain multiplexed with the uplink data portion, wherein downlink portion is separated from the uplink control portion by a first time gap, wherein the uplink control portion is separated from the uplink data portion by a second time gap; and
   retaining access to the shared radio frequency spectrum band by transmitting an unscheduled transmission during the uplink control portion of the transmission structure after receiving the uplink grant for the uplink data portion of the transmission structure, wherein transmission in the uplink control portion is associated with a listen before talk (LBT) procedure based on the first time gap; and
   transmitting data in the uplink data portion of the transmission structure based at least in part on transmitting the unscheduled transmission, wherein transmission in the uplink data portion is associated with a LBT procedure based on the second time gap.

2. The method of claim 1, further comprising:
   determining that no transmission is scheduled for the uplink control portion of the transmission structure.

3. The method of claim 1, further comprising:
   transmitting the unscheduled transmission as a single bit acknowledgement of the uplink grant.

4. The method of claim 1, further comprising:
   transmitting the unscheduled transmission as an unscheduled control transmission.

5. The method of claim 1, further comprising:
   transmitting the unscheduled transmission on a set of resources determined by at least one of pre-configuration information, a downlink grant, the uplink grant, resources allocated for an uplink transmission during the uplink data portion, or a combination thereof.

6. The method of claim 1, wherein the unscheduled transmission comprises a portion of a physical uplink shared channel (PUSCH) payload transmitted on physical uplink control channel (PUCCH) resources allocated for the uplink control portion.

7. The method of claim 1, further comprising:
   transmitting the unscheduled transmission as a channel reservation signal transmitted on an interlace of frequency resources allocated to bandwidth occupation transmissions.

8. The method of claim 1, further comprising:
   transmitting the unscheduled transmission as a sounding reference signal (SRS).

9. The method of claim 1, further comprising:
transmitting the unscheduled transmission without contending for access to the shared radio frequency spectrum band; and
contending for access to the shared radio frequency spectrum band prior to transmitting during the uplink data portion.

10. The method of claim 1, wherein the unscheduled transmission comprises an acknowledgement of the uplink grant, the method further comprising:
receiving, subsequent to the uplink data portion, a reactivation of the uplink grant.

11. A device for wireless communication, comprising:
a processor;
memory in electronic communication with the processor; and
instructions stored in the memory and operable, when executed by the processor, to cause the device to:
receive, in a downlink portion of a transmission structure on a shared radio frequency spectrum band, an uplink grant for an uplink data portion of the transmission structure, the transmission structure comprising the downlink portion, followed by and time domain multiplexed with an uplink control portion, followed by and time domain multiplexed with the uplink data portion, wherein downlink portion is separated from the uplink control portion by a first time gap, wherein the uplink control portion is separated from the uplink data portion by a second time gap;
retain access to the shared radio frequency spectrum band by transmitting an unscheduled transmission during the uplink control portion of the transmission structure after receiving the uplink grant for the uplink data portion of the transmission structure, wherein transmission in the uplink control portion is associated with a listen before talk (LBT) procedure based on the first time gap; and
transmit data in the uplink data portion of the transmission structure based at least in part on transmitting the unscheduled transmission, wherein transmission in the uplink data portion is associated with a LBT procedure based on the second time gap.

12. The device of claim 11, wherein the instructions are further executable by the processor to:
transmit the unscheduled transmission as a single bit acknowledgement of the uplink grant.

13. The device of claim 11, wherein the instructions are further executable by the processor to:
transmit the unscheduled transmission as an unscheduled control transmission.

14. The device of claim 11, wherein the instructions are further executable by the processor to:
transmit the unscheduled transmission on a set of resources determined by at least one of pre-configuration information, a downlink grant, the uplink grant, resources allocated for an uplink transmission during the uplink data portion, or a combination thereof.

15. The device of claim 11, wherein the unscheduled transmission comprises a portion of a physical uplink shared channel (PUSCH) payload transmitted on physical uplink control channel (PUCCH) resources allocated for the uplink control portion PUSCH waveform based at least in part on the first set of one or more waveform parameters and the second set of one or more waveform parameters.

16. The device of claim 11, wherein the instructions are further executable by the processor to:
transmit the unscheduled transmission as a channel reservation signal transmitted on an interlace of frequency resources allocated to bandwidth occupation transmissions.

17. The device of claim 11, wherein the instructions are further executable by the processor to:
transmit the unscheduled transmission as a sounding reference signal (SRS).

18. The device of claim 11, wherein the instructions are further executable by the processor to:
transmit the unscheduled transmission without contending for access to the shared radio frequency spectrum band; and
contend for access to the shared radio frequency spectrum band prior to transmitting during the uplink data portion.

19. The device of claim 11, wherein the unscheduled transmission comprises an acknowledgement of the uplink grant, and the instructions are further executable by the processor to:
receive, subsequent to the uplink data portion, a reactivation of the uplink grant.

* * * * *